(12) United States Patent
Tarditi, Jr. et al.

(10) Patent No.: US 7,733,347 B2
(45) Date of Patent: Jun. 8, 2010

(54) AUTOMATED CONSTRUCTION OF SHADER PROGRAMS

(75) Inventors: David Read Tarditi, Jr., Kirkland, WA (US); Vivian Sewelson, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 512 days.

(21) Appl. No.: 11/255,751

(22) Filed: Oct. 21, 2005

(65) Prior Publication Data

US 2006/0098019 A1 May 11, 2006

Related U.S. Application Data

(63) Continuation-in-part of application No. 10/982,027, filed on Nov. 5, 2004.

(51) Int. Cl.
*G06F 15/80* (2006.01)

(52) U.S. Cl. .................. 345/505; 345/503; 345/506; 345/522; 708/524; 718/105; 718/106

(58) Field of Classification Search ............ 345/501, 345/505, 522, 503, 506; 708/524; 718/105, 718/106
See application file for complete search history.

(56) References Cited

U.S. PATENT DOCUMENTS

| | | | | |
|---|---|---|---|---|
| 5,440,743 A * | 8/1995 | Yokota et al. ............ 710/200 |
| 5,604,851 A | 2/1997 | Taylor |
| 5,815,727 A * | 9/1998 | Motomura ................. 712/1 |
| 5,867,166 A * | 2/1999 | Myhrvold et al. ......... 345/419 |
| 5,867,683 A * | 2/1999 | Witt et al. ................ 712/218 |
| 6,578,197 B1 | 6/2003 | Peercy et al. |
| 6,741,255 B1 | 5/2004 | Furlani et al. |
| 6,765,571 B2 | 7/2004 | Sowizral et al. |
| 7,086,035 B1 * | 8/2006 | Mericas ................... 717/127 |
| 2001/0053275 A1 * | 12/2001 | Adachi et al. ............. 386/52 |
| 2002/0133784 A1 * | 9/2002 | Gupta et al. ............... 716/1 |
| 2003/0046494 A1 * | 3/2003 | Ziegler .................. 711/138 |
| 2003/0107597 A1 * | 6/2003 | Jameson ................. 345/762 |
| 2003/0218606 A1 | 11/2003 | Zhirkov et al. |
| 2004/0012597 A1 | 1/2004 | Zatz et al. |
| 2004/0095348 A1 | 5/2004 | Bleiweiss et al. |
| 2004/0139439 A1 * | 7/2004 | Machida et al. ........... 718/105 |
| 2004/0169671 A1 | 9/2004 | Aronson et al. |

(Continued)

OTHER PUBLICATIONS

Buck, Ian; Foley, Tim; Horn, Daniel, Sugerman, Jeremy; Fatahalian, Kayvon; Houston, Mike; Hanrahan, Pat; "Brook for GPUs: Stream Computing on Graphics Hardware", ACM Transactions on Graphics (TOG), vol. 23 , Issue 3 (Aug. 2004) Proceedings of ACM SIGGRAPH 2004 Session: Large meshes and GPU programming, pp. 777-786.*

(Continued)

*Primary Examiner*—Xiao M Wu
*Assistant Examiner*—Phi Hoang
(74) *Attorney, Agent, or Firm*—Klarquist Sparkman, LLP

(57) ABSTRACT

Although GPUs have been harnessed to solve non-graphics problems, these solutions are not widespread because GPUs remain difficult to program. Instead, an interpreter simplifies the task of programming a GPU by providing language constructs such as a set of data types and operations that are more familiar to non-graphics programmers. The interpreter maps these familiar language constructs to the more difficult graphics programming resources such as DirectX®, OpenGL®, Cg®, and/or HLSL®.

18 Claims, 13 Drawing Sheets

U.S. PATENT DOCUMENTS

| | | | |
|---|---|---|---|
| 2004/0237074 A1 | 11/2004 | Aronson et al. | |
| 2005/0055394 A1* | 3/2005 | Worley | 708/523 |
| 2005/0125369 A1 | 6/2005 | Buck et al. | |
| 2005/0231514 A1 | 10/2005 | Harper et al. | |

OTHER PUBLICATIONS

Riffel, Andrew; Lefohn, Aaron E.; Vidimce, Kiril; Leone, Mark; Owens, John D.; "Mio: Fast Multipass Partitioning via Priority-based Instruction Scheduling" SIGGRAPH/EUROGRAPHICS Conference on Graphics Hardware, Proceedings of the ACM SIGGRAPH/EUROGRAPHICS conference on Graphics hardware, 2004, pp. 35-44.*

"2004 ACM Workshop on General-Purpose Computing on Graphics Processors," *ACM SIGGRAPH*, Edited by A. Lastra et al., Los Angeles, CA, Aug. 7-8, 2004, 79 pages.

Buck et al., "Brook for GPUs: Stream Computing on Graphics Hardware," *Proceedings of SIGGRAPH*, 2004, 10 pages.

Chatterjee et al., "Scan Primitives for Vector Computers," *Proceedings Supercomputing '90*, Nov. 1990, pp. 666-675.

Engel et al., "Programming Pixel Shaders," and "Optimizing Software Vertex Shaders," *Direct3D ShaderX: Vertex and Pixel Shader Tips and Tricks*, Wordware, 2002, 29 pages.

Fernando et al., "The CG Tutorial—The Definitive Guide to Programmable Real-Time Graphics," Chapter 1, Appendixes B and E, *Addison-Wesley Publishing*, 2003, 55 pages.

Gray, "Microsoft DirectX 9 Programmable Graphics Pipeline," Microsoft Press, 2003, 69 pages.

Guibas et al., "Compilation and Delayed Evaluation in APL,". *Conf. Record of the Fifth Annual ACM Symp. on Princ. of Prog. Lang*, Tucson, Arizona, ACM, Jan. 1978, pp. 1-8.

Microsoft, "DirectX 9.0 SDK Update," msdn.microsoft.com/library, Aug. 2005 (printed from internet on Sep. 1, 2005), 17 pages.

Riffel et al., "Mio: Fast Multipass Partitioning via Priority-Based Instruction Scheduling," *Graphics Hardware 2004*, Aug. 2004. pp. 35-44.

Rost et al., "OpenGL Shading Language," Chapters 1, 7, 8, 17, and Glossary, *Addison-Wesley Publishing*, 2004, 273 pages.

Schreiner, et al., "OpenGL Programming Guide—Fourth Edition," Chapters 1, 7, and 8, *Addison-Wesley Publishing*, 2004, 128 pages.

Whitted, "Graphics Memory for General Applications," *ACM Workshop on General Purpose Computing on Graphics Processor*, Los Angeles, CA, Aug. 7-8, 2004, 37 pages.

Woo, et al., "OpenGL Programming Guide—Third Edition," Chapters 1, 7, 8, and Glossary, *Addison-Wesley Publishing*, 1999, 158 pages.

U.S. Appl. No. 10/837,382, filed Apr. 30, 2004, Buck et al.

U.S. Appl. No. 10/445,397, filed May 23, 2003, Aronson et al.

Ian Buck, Tim Foley, Daniel Horn, Jeremy Sugerman, Kayvon Fatahalian, Mike Houston, and Pat Hanrahan, "Brook for GPUs: Stream Computing on Graphics Hardware," ACM SIGGRAPH, 2004, 10 pages.

Andrew Riffel, Aaron E. Lefohn, Kiril Vidimce, Mark Leone, and John D. Owens. "Mio: Fast Multipass Partitioning via Priority-Based Instruction Scheduling." *Graphics Hardware 2004*, pp. 35-44, Aug. 2004.

Siddhartha Chatterjee, Guy E. Belloch, March Zagha, "Scan Primitives for Vector Computers," Supercomputing, Nov. 1990, 28 pages.

McCool et al., "Shader Algebra," ACM Transactions on Graphics, vol. 23, Issue 3, 2004, pp. 787-795.

Budd, Timothy A., "An APL Compiler for a Vector Processor," *ACM Transactions on Programming Languages and Systems*, vol. 6, No. 3, Jul. 1984, pp. 297-313, 17 pages.

McCool et al., "Shader Algebra," Jul. 19, 2004, http://www.cgl.uwaterloo.ca/Projects/rendering/Papers/shaderalgebra.pdf, pp. 1-9, 9 pages.

McCool et al., "Metaprogramming GPUs with Sh," Canada, A.K. Peters, Ltd., 2004, 291 pages.

Tarditi et al., "Accelerator: Using Data Parallelism to Program GPUs for General-Purpose Uses," *Proc. of the 2006 ASPLOS Conference*, Oct. 21-25, 2006, 11 pages.

* cited by examiner

AUTOMATED CONSTRUCTION OF SHADER PROGRAMS

CROSS REFERENCE TO RELATED APPLICATION

This application is a continuation-in-part of U.S. application Ser. No. 10/982,027, filed Nov. 5, 2004, which is incorporated herein by reference in its entirety.

TECHNICAL FIELD

The technical field relates generally to programming graphics processing units, and more specifically, to automated programming for parallel processing.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A graphics card (e.g., a graphics processor, GPU, etc.) is a special-purpose processor designed for executing computer graphics algorithms on a general purpose computer. Graphics processors often include a specialized programming model that corresponds to the details of a typical computer graphics pipeline. A central processing unit (CPU) uses a graphics processor as a co-processor, much in the way that CPUs have historically used floating point co-processors. The CPU offloads graphics-related computation to a GPU, since the GPU efficiently executes graphics-related computation.

The computational capabilities of many GPUs now significantly exceed the capabilities of CPUs particularly in the area of floating point computation and vector processing. Because the graphics card (e.g., GPU) is often more powerful than the CPU, there has been significant interest in programming the GPUs to solve many (graphics) and non-graphics problems. Although GPUs have been harnessed to solve non-graphics problems, it has been difficult for non-graphics programmers to learn because of the specialized programming model used by GPUs.

There are several obstacles that programmers face. First, they have to learn a specialized programming model used by GPUs. Two common programming interfaces for programming GPUs are DirectX® and OpenGL®. Both are difficult to learn because they are graphics computation oriented. Second, after learning a specialized programming model, a programmer is required to learn a new specialized programming language such as Cg® or HLSL®. Third, there are many subtleties and limitations (e.g., resource limitations) required when programming a GPU that are unknown to procedural or object-oriented programmers. Failure to manage these resources properly will result in a non-working program. For a given graphics programming environment, there may be limitations on the size of programs (e.g., instruction counts), limitations on the available memory, and limitations on the number of input data structures, as well as many other possible limitations. Because of these difficulties, the benefits of a graphics engine have not yet been harnessed by many general purpose programmers.

SUMMARY

The described technologies provide methods and systems for the automated programming of a GPU. The problems noted above are addressed, at least in part, by the systems and methods disclosed herein.

In one example, an interpreter simplifies the task of programming a GPU by providing a set of data types and operations that are more familiar. For example, a data type called a multi-dimensional parallel array is provided. Multi-dimensional parallel arrays appear friendly to programmers because they appear similar to arrays. In one example, a high-level language called C# (pronounced C-sharp) is used to program a graphics processor, although many other languages could be used as well. A set of operations and data types are provided in the selected language directly or via an API. An interpreter is designed to receive these operations and data types as inputs, and to map these operations and data types to one or more low level programming interfaces such as Microsoft Corporation's DirectX® and/or OpenGL® of Silicon Graphics, Inc.

The interpreter allows programmers to use more familiar high-level language constructs, in a high level language such as C#, C++, etc. Some of these high level languages provide garbage collection techniques that further simplify resource management such as memory de-allocation. In one such example, an interpreter provides a set of language constructs such as operations and data types that are easy for programmers to use. The interpreter receives these language constructs as inputs, and programs the GPU transparently to the programmer, according to the resource limitations of the GPU environment. Although not required, such an interpreter can be used with existing high-level environments without modifications to compilers or runtime systems. In one such example, the language constructs and an associated interpreter are provided in a high-level language environment such as C#, and a typical C# programmer can utilize the power of GPU computation without programmer knowledge of an underlying graphics interface or interpreter such as DirectX®, OpenGL®, Cg®, HLSL®, or programmer understanding of the GPU or programs (e.g., shaders) used to provide the resulting parallel processing power.

A computerized method provides a parallel programming interface with multidimensional data types and a set of parallel operations. The method receives a parallel processing request at the parallel programming interface, where the parallel processing request includes an evaluation request for a parallel operation on an input array. The method creates shader programs formed according to resource constraints of a graphics environment. The method invokes the shader programs on a graphics processor and returns the output as a response to the evaluation request.

A computer system includes a graphics card with graphics memory and a graphics processing unit. Additionally, the system includes a central processing unit coupled to computer memory and the graphics card. An application program is executing on the central processing unit and requesting parallel processing. An interpreter executing on the central processing unit receives a request from the application program in the form of a parallel processing request, and creates shader programs. While creating the shader programs the interpreter monitors characteristics of the shader programs and breaks a shader program into two or more programs when the monitored characteristics violate requirements of the graphics processor. The interpreter invokes the created shader programs on the graphics processor to obtain a parallel processing output, and returns the parallel processing output to the application program.

A tangible computer-readable medium includes computer-executable instructions for receiving a parallel processing request at a parallel programming interface. The parallel processing request includes an evaluation request with parallel operations and one or more input arrays. The instructions interpret the evaluation request and construct one or more shader programs formed according to resource constraints of a graphics environment. The instructions invoke the shader programs on the a graphics processor and return the output as the evaluation request.

Additional features and advantages will be made apparent from the following detailed description, which proceeds with reference to the accompanying drawings.

DETAILED DESCRIPTION

Overview

Parallel processing provides significant increases in efficiency for many applications including non-graphics programming. This technology focuses on providing a simplified way for a programmer to define parts of a program that may be more efficiently performed using parallel processing. The described technologies provide a programming interface to programmers. Program logic, such as an interpreter, a compiler, or a just-in-time compiler, receives requests at the programming interface and creates programs to run on the parallel processor. The program logic invokes the created programs on the parallel processor and returns the parallel processing results in response to a request at the programming interface. Thus, the program logic converts high-level programming constructs to low level parallel processing programs, such as shader programs. Thus, a programmer may use parallel processing, such as a graphics processing unit, without learning a parallel processing programming environment or its associated resource constraints.

Example Method for Programming Graphics Processors

Figure 1:
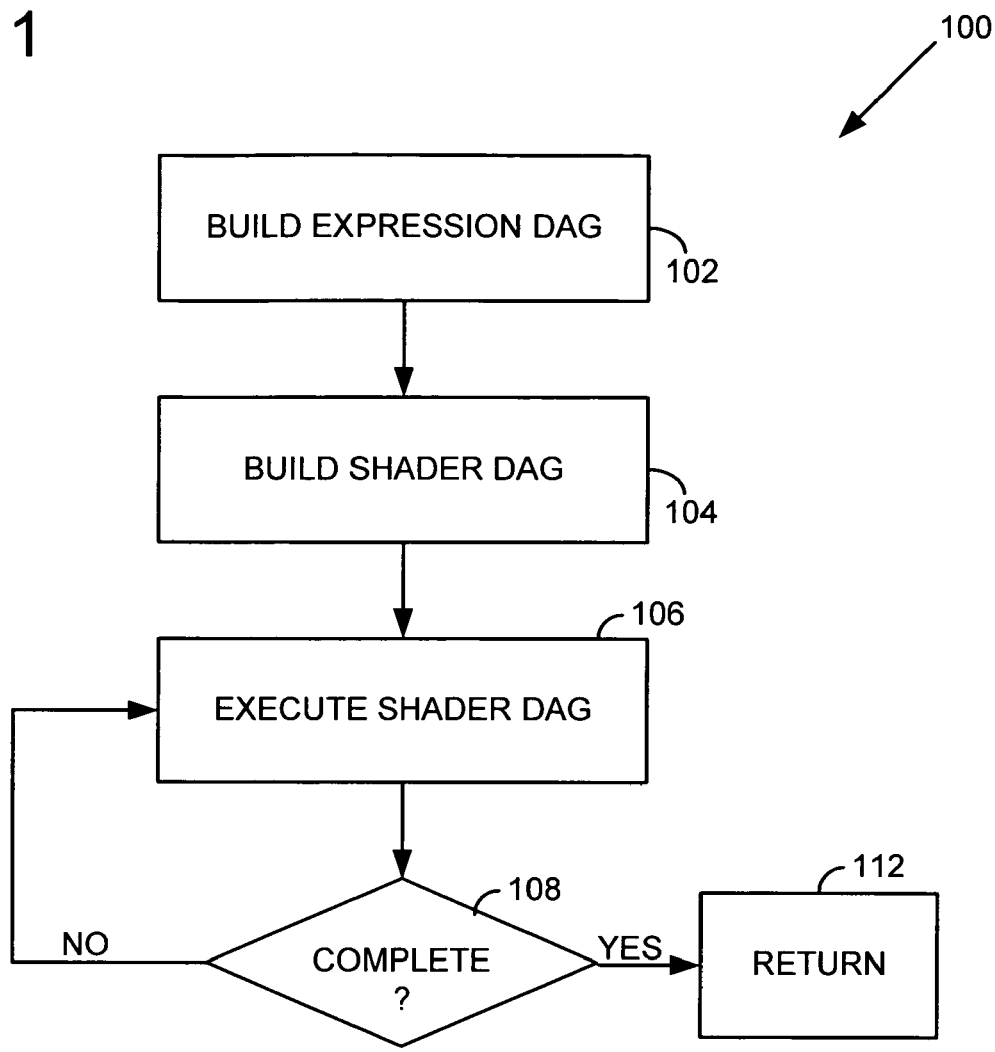
FIG. 1 is a flowchart for an example method for programming graphics processors using general purpose programming language constructs.

FIG. 1 is a flowchart for an example method for simplified programming of a parallel processor.

As shown, the method 100 receives a series of requests comprising multi-dimensional data parallel arrays (MDPAs) and associated operations and programs a parallel processor, such as a graphical processing unit.

At 102, the method receives the series of requests comprising multi-dimensional data parallel arrays and associated operations. The method builds a data structure comprising an expression that represents the requests. In one example, the expression data structure is a directed acyclic graph (DAG) comprising MDPAs, operations, and possibly other input values such as constants. In one such example, this data structure representing an expression of a directed acyclic graph is called an expression DAG (e.g., eDAG). Optionally, the method delays evaluation of the expression DAG, for example, until an expression result must be returned. For example, when an expression result is requested or required for evaluation, the method proceeds to step 104.

At 104, the method traverses the data structure 102 and creates parallel processing programs, such as shader programs. In one such example, the method maps an operation indicated in the data structure 102 to one or more shader programs. For example, the method identifies one or more portions of the expression 102 to be evaluated, and then creates or selects a graphics resource for evaluating that portion. In one example, the graphics resources used to evaluate the expression comprise graphics programs (e.g., shaders). The method traverses the data structure 102, selects an operation identified in the expression, and locates or creates parallel processing instructions, such as shader program instructions, to perform the operation. For example, the method begins a depth first search of an expression DAG 102 and builds or locates a shader(s) that is able to process requested operations on the expression. If an existing shader is not available for processing a requested operation, the method builds (e.g., compiles) a shader for the operation. A shader may already exist for a requested operation, or a shader may have been recently built for the operation. In order to automatically build parallel processing programs, such as shader programs, the method keeps track of resource constraints required by a given parallel processing environment. For example, the method tracks resource constraints such as the number of instructions in the shader program or the number of times various types of registers are used. The method may also break shader programs into smaller programs in order to comply with resource constraints or other limitations of a given parallel processing environment. Thus, the method provides one or more parallel processing programs to perform the operations represented by the expression DAG. Optionally, the one or more parallel processing programs are assembled in a data structure. In one such example, the programs are shader programs, and the shader programs are assembled into a shader program directed acyclic graph (e.g., a shader DAG, or sDAG). In one such example, shader programs are the nodes of the sDAG.

At 106, the method directs the parallel processor to load and run the created program(s). For example, the method loads and invokes shader programs on the graphics card to perform the operations of the identified or created programs. The method loads a shader into graphics memory along with a portion of the expression (e.g., one or more MDPAs inputs) identified as corresponding to the identified or created shader. The method then directs the graphics processor to execute the shader in order to obtain a parallel processing output. Upon completion of execution of a shader program with the given input(s), the method continues at step 108.

At 108, the method determines whether another parallel processing program is required to evaluate the expression 102. For example, the method determines whether or not the shader DAG 104 has another shader program (or another input for the same shader program) that needs to be executed on the parallel processor in order to return the expression DAG output. If the shader DAG evaluation is complete 108, the method returns the results 112. If evaluation is not complete 108, the method returns to load and execute another program from the shader DAG 106. The method continues evaluating the expression, and returns 112 results of the expression evaluation upon completion.

Example System for Programming Graphics Processors

Figure 2:
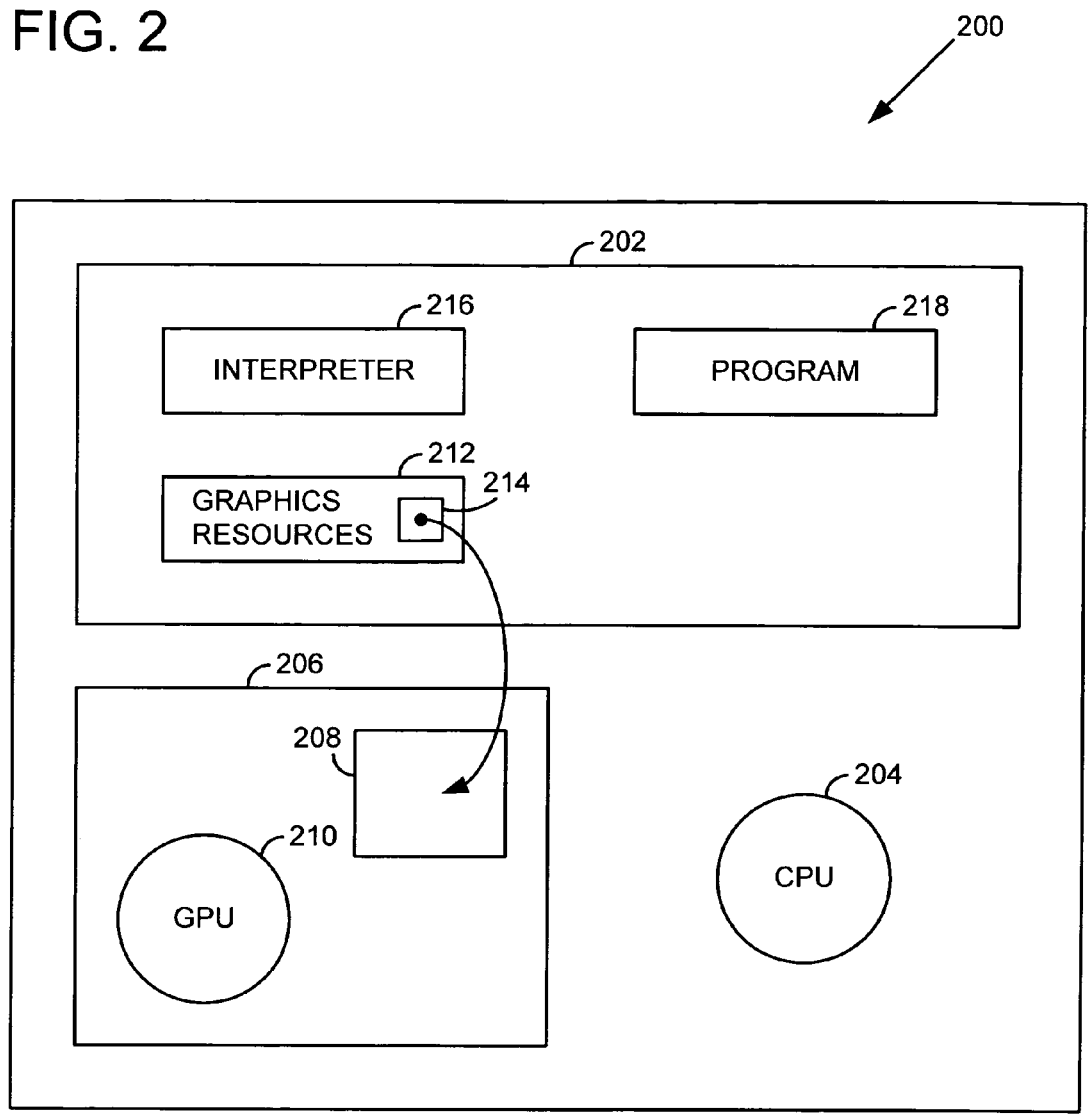
FIG. 2 is a block diagram of an example system for programming a graphics processor.

FIG. 2 is a block diagram of an example system for the simplified programming of graphics processor units using general purpose programming languages.

The computer system 200 includes a central processing unit 204, a computer memory 202, and a graphics card 206. The computer memory includes a program 218, an interpreter 216, and graphics resources 212. The graphics resources comprise graphics programs, such as shader programs 214. The graphics card includes graphics memory 208 and a graphics processing unit 210.

In one example, the program 218 includes a series of requests including a request to perform parallel processing. In one such example, the series of requests include multi-dimensional data parallel arrays (MDPAs) and associated parallel processing operations. In one such example, the programmer knowingly defines data types as MDPAs in order to signal to the interpreter to process the series of requests on a parallel processor (e.g., a graphics card) instead of a CPU. In one specific example, the programmer does not know how to program a graphics processor, or the programmer does not have time to program the graphics processor, so the programmer instead uses MDPAs in the source code because it is understood that an interpreter will translate these abstract data types and associated operations into parallel processing requests on the graphics processor using graphics programs such as shaders.

In another example, the interpreter 216 processes a series of requests received from the program 218, by programming a graphics card 206. In such an example, the interpreter converts the series of requests into the program paradigm of an underlying graphics resources 212 such as DirectX®, OpenGL®, Cg®, or HLSL®, etc. In one such example, the interpreter maps the series of requests into one or more shader programs available via the graphics resource(s). The interpreter then executes the shader programs, obtains the results, and converts an output texture from a shader program back into a standard language array in the language of the program 218, and returns the standard array to the program 218.

In another example, the series of requests from the program 218 are converted into a directed acyclical graph (e.g., an expression DAG) representing the MDPAs and associated operations. In such an example, the expression DAG is converted into a directed acyclical graph of shader programs (e.g., shader DAG) to be evaluated by the interpreter 216 by traversing the shader DAG and performing the shader programs on a parallel processor. Operations represented in the expression DAG are converted into shader programs. An interpreter maps operations in the expression DAG to programs executable in the graphics resources. In one such example, the interpreter assembles parallel processing instructions into shader programs, and instructs the graphics processor to execute the shader programs to obtain the desired operation result. In one such example, an expression DAG is converted into a shader DAG. In one such example, operations are performed via shaders until a requested result is obtained.

In one example, the interpreter is a just-in-time compiler. In another example, the interpreter is a component in the language of the program 218, or otherwise made available (e.g., library, system resource, etc.) to the program 218.

Example GPU Programming Layers

Figure 3:
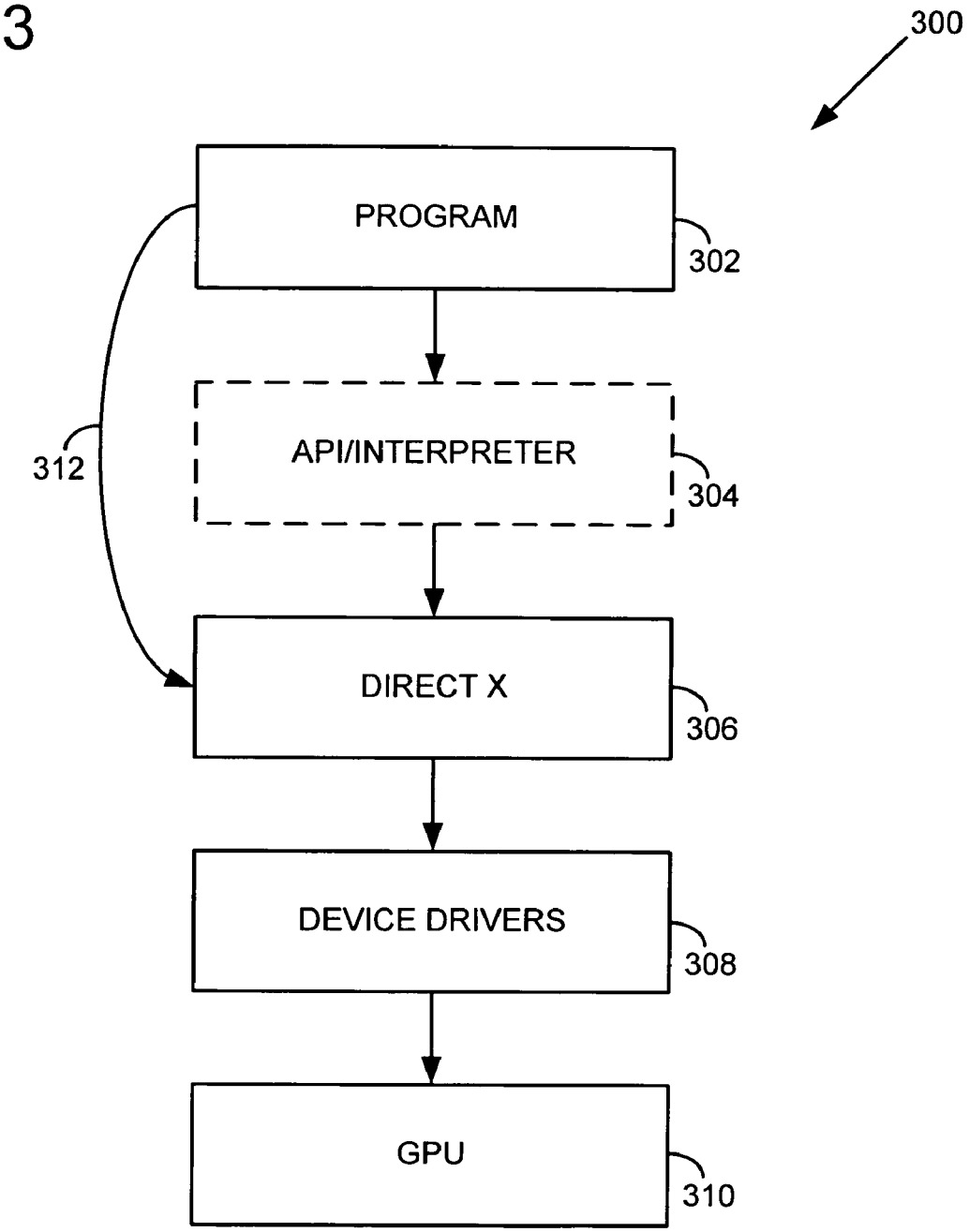
FIG. 3 is a block diagram of example programming layers for programming a graphics processor.

FIG. 3 is a block diagram of an example method 300 of programming a GPU. In the past, a program 302 accessed 312 a DirectX® or an OpenGL® application programming interface (API) 306 to program the graphical processing unit (GPU). These APIs 306 provided an assembly language for programming GPUs, which is essentially an assembly language for programming vertex shaders and pixel shaders. These APIs allowed a programmer to generate a sequence of instructions, using DirectX® or OpenGL®. After the instructions were generated, the programmer then instructed DirectX® or OpenGL® to execute the instructions. Upon this request, DirectX® or OpenGL® made calls to a device driver that controlled the GPU hardware 310 and that translated these instructions to actual machine instructions for the GPU hardware 310. Since the API 306 is designed to program high performance gaming, it is difficult to use.

Instead, a high-level application programming interface (API) and interpreter is provided 304 to programmers of high-level programming language programs 302. This API 304 could also be provided as syntactic extensions to a language. For example, the syntactic extensions of (e.g., data types and operators) could be provided as language constructs and compiled via the language compiler of the existing programming language 302. Thus, it is not required to be a separate API or interpreter.

In one example, a new data type called a multi-dimensional data parallel array (MDPA) is introduced along with operations that can be performed on the MDPAs. Thus, the API 304 provides MDPAs and associated operations that are mapped down to the lower level API 306, thereby invoking the device drivers on the GPU. In one such example, the interpreter is performing just-in-time compilation of these MDPAs and operations. The resulting just-in-time compiled code generates calls according to the DirectX® or OpenGL® API 306. For example, the device drivers translate 308 the API calls 306 into code that will run on the GPU 310.

For contrast of the described API 304 or language extensions 304 with the prior languages 306 such as OpenGL®, DirectX®, Cg® and HLSL®, these languages were not as abstract. So even though some allowed programming in a higher level language, such as C, the constructs used to program in Cg® and HLSL® were explicitly tied to the OpenGL and DirectX® constructs, respectively. Thus, a Cg® or HLSL® programmer was working with bitmaps or textures, and was programming a shader to work on a bitmap. Whereas, the described API 304 or language constructs 304 are created and manipulated in higher level constructs, such as an MDPA.

Example Programming Interface

In one example, an example system comprises an application programming interface (API) provided to programmers, and an interpreter for manipulating expressions generated according to the API. In one such example, the API provides language constructs for programming comprising a new set of data types and a set of operations that can be performed on the data types. In one such example, the API is provided via a library component that defines the language constructs and interprets service requests made via the new set of data types and operations. In one such example, the service requests are interpreted by an interpreter embedded in the library. For example, one new data type is called a multi-dimensional data parallel array. MDPAs are available in one or more dimensions. Typically, one to four dimensions will be requested by programmers for many practices. A MDPA is analogous to a multi-dimensional array in conventional languages, and the dimensions are analogous to dimensions of arrays. Although not required, in one example, a MDPA can be restricted in the set of operations that can be performed on it. For example, random access or access via pointers can be restricted on MDPAs.

Example Operations on MDPA

A set of operations are provided for operating on MDPAs. For example, operations for defining or creating MDPAs, operations for coercing MDPAs to and from arrays and bit maps, operations for arithmetic manipulation of MDPAs, operations for Boolean evaluations on MDPAs, operations for reductions and scans on MDPAs, operations for altering MDPA dimensions, and algebraic operations on MDPAs. In more detail, these operations comprise:

1. Creation of a MDPA: A MDPA is typically created by converting a standard language array or bitmap into a MDPA.
2. Creation of a standard language array or bitmap: A MDPA can be converted back into a standard language array or bitmap.
3. Arithmetic operations on MDPAs: addition, multiplication, division, subtraction, negation, sine, cosine, maximum, minimum, exponentiation, absolute value, logarithm, floor and ceiling.
4. Boolean operations on MDPAs: and, or, not, greater than, less than, and equal.
5. Reductions and scans across a dimension: addition, multiplication, max, min, and, or.
6. Operations that alter the dimensions of the MDPA: expand, drop dimension, tile, transpose, shift, rotate, pad, scatter and gather.
7. Linear algebra operations: inner product, outer product, etc.

The explicit coercions between MDPAs and standard arrays are a desirable part of the described technology. MDPAs can be thought of as data structures that exist mainly in the GPU memory, while standard arrays exist mainly in CPU memory. Thus, arrays are coerced into MDPAs that are manipulated by shaders that run on the GPU.

In one example, and although not required, when operations are performed on MDPAs, the results are produced in new MDPAs. In such an example, operations do not modify the value of an old MDPA. In this example, the interpreter has the freedom to reorder MDPA operations without being constrained by side-effects. For example a MDPA in GPU memory is not changed by an operation, but the results of an operation on that MDPA are provided in a new results MDPA.

Example Interpreter

One of the challenges in implementing the provided language constructs (e.g., 304) is hiding the details of resource management from the programmer and still providing a system that works.

Figure 4:
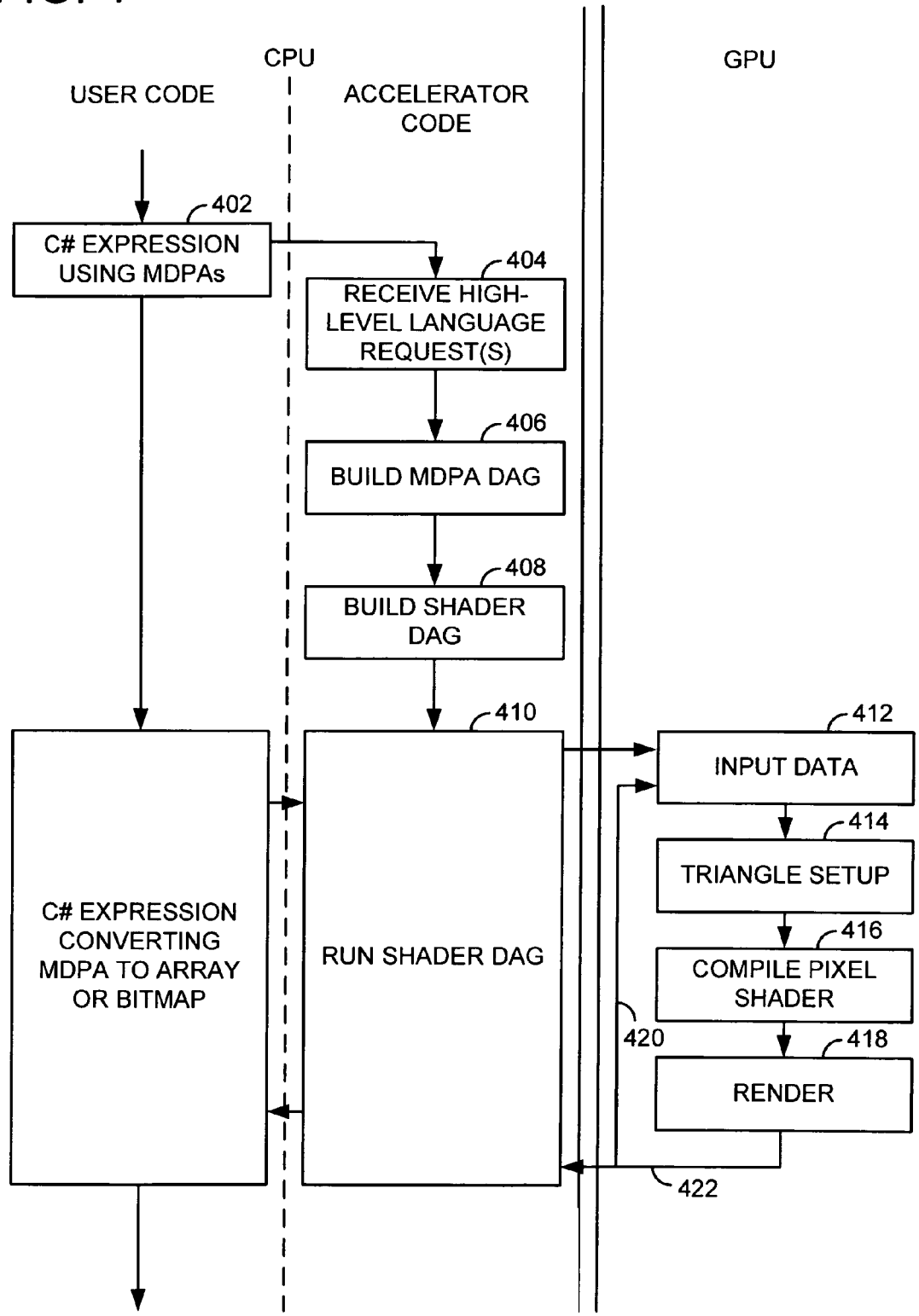
FIG. 4 is a flowchart of an example method of programming a graphics processing unit.

FIG. 4 is a flow chart of an example method of programming a graphics processor. MDPAs are defined in high-level language constructs written by a programmer 402. In one example, an interpreter receives request(s) 404 according to an API and assembles or translates 404-410 the requests into a series of parallel processing instructions, similar to assembly language instructions, according to an underlying graphics language such as DirectX® or OpenGL®. In one example, the system invokes garbage collection, which may not otherwise immediately reclaim resources. Prompt reclamation of scarce GPU resources is even more important in a resource intensive and limited GPU environment.

In one example, the API operations (e.g., arithmetic, Boolean, etc.) do not immediately do computation on MDPAs. Instead, in one such example, the interpreter builds 406 an expression directed-acyclic graph (e.g., expression DAG) that represents a computation tree, the nodes of the tree comprising input MDPAs and the operations to be performed on the input MDPAs.

In one such example, computation of the operations on MDPAs is delayed until a request is made to convert the MDPA back into a standard language array. At this point, the programmer has defined 402 the MDPA(s) and the operations to be performed on the defined MDPA(s), and the programmer has requested the results (not shown). The interpreter converts an expression DAG into shader programs that perform the corresponding operations. In one such example, the expression DAG is converted into a shader program directed-acyclic graph (e.g., shader DAG). The interpreter emits a series of GPU operations exposed and supported by the GPU interface (e.g., DirectX® or OpenGL®), and if desirable, these instructions can be held in a data structure, such as a shader DAG. In one example, the interpreter rearranges 408 the order of MDPA operations (e.g., reorganizes the DAG) to stay within the resource constraints of the target GPU. In addition, the interpreter may break the MDPA operations into a set of GPU programs 408 (e.g., shaders), so that each program is short enough to be executed on the GPU within the specific resource constraints. In one such example, the interpreter maps the MDPA operations onto a set of pixel shaders 408 according to the required operations. In another example, the interpreter optimizes 408 the mapping of MDPA operations to pixel shaders and GPU textures to increase efficiency.

A texture is a multidimensional section of video memory that the GPU references when it executes a pixel shader program. In the graphics context, a pixel shader calculates the color of each pixel on the output surface in parallel. However, as previously stated, these pixel shader programs provide parallel processing which is useful in many other non-graphics contexts. A pixel shader receives 412 zero or more textures as input. Many pixel shaders receive two or more textures as inputs. In one respect, the GPU is designed to compute the colors of many pixels in parallel. The parallel processing is one of the benefits harnessed by the described technologies. The computation performed by the GPU is based on the shader program instructions that are assembled or selected automatically by the interpreter, along with many other factors, such as resource constraint limitations and monitoring by the interpreter. This computational power of the GPU is harnessed for general purpose computing by converting an input MDPA to a texture in video memory and generating a pixel shader program or programs designed to compute pixel colors. These colors can be interpreted as the desired output. In order to harness the power of the GPU for general purpose programming, the pixel shader programs have limitations that need to be managed by the interpreter since the programmer is no longer required to manage these resources. In one example, an interpreter manages (410) one or more of the following:

1. Pixel shader inputs are output from a vertex shader. Two pixel shaders can not directly follow each other.
2. A pixel shader is often allowed only a limited number of instructions.
3. Pixel shaders often do not support branching or looping.
4. A GPU is programmed automatically by the interpreter via a special purpose language designed for rendering graphics.
5. Typically, a fixed or limited number of textures can be accessed by a pixel shader.
6. Pixel shaders can use no temporary memory.
7. Pixel shaders can use only a limited number of constants.
8. Pixel shaders can use only a limited number of registers.

In one example, the interpreter receives 404 definitions of MDPAs and operations on the defined MDPAs via the API, but the interpreter delays requesting the GPU to evaluate the operations. Instead, by building up an expression DAG and delaying computation of that DAG until the result is requested by the programmer, the interpreter is able to minimize the number of textures used, and to manage the number of operations per shader. Additionally, by managing the GPU resources, the interpreter reduces the overhead of DirectX® and OpenGL® for the programmer. Without this interpreter delay, a complete rendering of the full graphics pipeline would be required for each operation.

Once the result is requested, or sooner, a DAG of shaders is built 408.

When this shader DAG is executed, the interpreter initializes 410, 412 input textures, constants, a vertex buffer and vertex shader, to run each pixel shader in the shader DAG. The looping and branching as provided by the interpreter 420 overcomes the lack of looping and branching in a pixel shader. Therefore a single operation, such as an inner product, can be broken up into many shader programs (e.g., nodes of a shader DAG).

Theoretically, every node in the expression DAG could be computed as a separate texture. However, if this were done, the interpreter would quickly run out of texture memory. Thus, as an additional optimization, many expression nodes are often combined into one shader node or pixel shader 420. However, for cases when this automatic optimization is not sufficient, the user is allowed to force an evaluation of portions of the entire DAG and the intermediate textures are discarded for better memory management. Some optimizations include chaining arithmetic operations into one shader. Other operations, such as shift and rotate, may only change which MDPA element is operated upon. This can be expressed as a texture coordinate change on a shader program that performs the arithmetic operation later and thus need not be computed separately.

The GPU requires input data 412 such as textures (e.g., MDPAs), constants, etc., for processing a requested shader. The vertex buffer is created with two triangles which cover the input texture in graphics memory 414, and a pixel shader is compiled 416, and the shader renders the requested output 418. For example, pixel shader assembly code is compiled 416 into a shader that can execute a desired operation. An output may require several iterations 420 until the desired DAG evaluation is complete 422. Significant work has been compiled indicating how to utilize graphical programs (e.g., shaders) for performing non-graphical parallel processing (see e.g., Buck et al., "System and Method for Accelerating and Optimizing The Processing of Machine Learning Techniques Using A Graphics Processing Unit", U.S. patent application Ser. No. 10/837,382, filed Apr. 30, 2004, which is incorporated herein by reference).

Example Language Constructs

An example set of semantic language extensions for improving or accelerating graphics programming (e.g., Accelerator language constructs) are provided to a programmer. These language constructs enable a broad set of data parallel applications in the below described abstract context, without requiring the programmer to understand graphics programming (e.g., programming shaders) such as DirectX®, OpenGL®, Cg®, HLSL®, etc. An interpreter (e.g., Accelerator interpreter) receives the Accelerator language constructs and translates them into graphics programming calls. The language semantics are broken into data types, operations, and libraries.

Accelerator Data Types

Parallelism in processing is expressed as operations on multi-dimensional data parallel arrays (MDPAs). A MDPA is an ordered, possibly multi-dimensional, collection of elements of a simple data type, such as float or integer. Accelerator MDPAs are defined as AcMDPA to indicate they are Accelerator data types. These AcMDPAs can be manipulated, combined, or altered using operations described below. In one example, it is desirable if the element values in an MDPA are fixed for the duration of the computation of a requested operation. This allows an Accelerator Interpreter to schedule sub-computations in parallel on any available hardware.

An AcMDPA can be constructed from various data sources such as Arrays or Bitmaps. In standard languages, individual array elements are typically accessible, for example, by requesting an element at a given index location. In one example, individual element access is disabled for AcMDPAs. The Accelerator Interpreter uses the AcMDPAs in calls made to underlying graphics programming APIs, so this functionality is not necessary to the programmer using the Accelerator API. However, as will be discussed later, once the programmer requests results from an associated operation, the interpreter coerces the AcMDPA back into a standard array where a programmer can index individual elements. Thus, the AcMDPA exists for ease of expression and for efficient computation of algorithms that can be better performed with parallel processing.

AcMDPAs have an element data type. For example, many data types can be supported such as the intrinsic types shown in Table A.

TABLE A

| Intrinsic Type | Storage |
| --- | --- |
| System.Boolean | 1 byte |
| System.Byte | 1 byte |
| System.Double | 8 bytes |
| System.Int32 | 4 bytes |
| System.Int64 | 8 bytes |
| System.Int16 | 2 bytes |
| System.Single | 4 bytes |

Additionally, if desirable, QuadFloats (a record or tuple of 4 single precision floating point numbers), pairs of doubles precision floating point numbers, QuadInts and DoubleLongs can be supported, along with others. The data type of an AcMDPA is determined by the type of the values it contains (intrinsic types) and by its shape (dimensions). Strongly typing AcMDPAs is not required, but in one example, an integer AcMDPA of dimensions 4×6, is not the same type as an integer AcMDPA of shape 8×3.

AcMDPA Construction

In one example, an AcMDPA is created with two inputs specified—the shape of the new MDPA and the initial values of entries in the MDPA. In one example, an interpreter receives the inputs and converts the inputs (e.g., an existing array) to an AcMDPA, where the created AcMDPA takes both its dimensions and initial values from those of the array. In another example, creation from a bitmap is supported. Since a bitmap has two dimensions along with quad or single float values, a bitmap also contains enough information to create an AcMDPA. In one example, once a new AcMDPA is constructed, the association between the new AcMDPA and the input array or bitmap ends.

In one example, an AcMDPA is defined with the following statement:

Void CreateMDPA(T[, . . . ] af, out AcMDPA<T> acsT)

This statement creates a new AcMDPA of type T with the same dimensions and initial data as af, so long as the intrinsic type of T is supported. For example, if af was defined as [1, 3, 7], the output AcMDPA would be of one dimension of three integer intrinsic elements.

In another example, and for ease of use, an AcMDPA is defined as follows:

Void CreateMDPA(Bitmap bmp, out AcFloat4MDPA acs)

This statement creates a new AcMDPA whose dimensions and initial data are the same as those of the input bmp, and the following statement, Void CreateMDPA(Texture tex, out AcFloat4MDPA acs), defines a new quadfloat AcMDPA whose dimensions and initial data are the same as those of the input "tex". From these examples, it is apparent how to define various AcMDPAs. The types of AcMDPAs supported by the interpreter should preferably be diverse. Although not required, this allows a programmer to learn the AcMDPA data types and operations once, and allows an Accelerator interpreter to translate the inputs to the underlying graphics programming model regardless of whatever model is in use (e.g., DirectX®, OpenGL®, Cg®, HLSL®, etc.).

A specific Accelerator API and Interpreter could support other ways of creating AcMDPAs. For example, to create an AcMDPA of a particular dimension and with constant element values, the Accelerator interface supports a constructor that does this by taking the constant value and an array of dimensions as follows:

void CreateMDPA (<T> valueConst, int[,,] aiDimensions, out AcMDPA<T> acs)

In one example, AcMDPAs are strongly typed where the type includes not only the underlying data type, but also the rank and dimensions. In one such example, the typing information is determined at compile time. In one example, data ranks are determined at compile time by strong typing (e.g., AcFloatMDPA2D (two dimensional float), AcFloatMDPA3D (three dimensional float), etc.), in another example, rank is determined at run time along with the dimensions. In another example, a specific AcMDPA is defined with the number of elements in the latter dimension fixed, such as AcFloatMDPA[,,4]. This would be helpful in an example where it is known in advance and should be maintained as a constraint that the last rank of an AcMDPA is comprised of a dimension of four float values.

Exporting an AcMDPA

Programmers utilize the Accelerator API (AAPI) to request parallel processing via the AcMDPAs and operations. The Accelerator Interpreter (AI) receives the AAPI requests and maps them to the underlying graphical programming APIs (GAPIs). Once the interpreter maps the calls to one or more shaders via the GAPIs, a result is returned to the AI from via the GAPI outputs. These results are returned to the programmer as outputs of the AAPI requests. These outputs of the AAPI requests live in system memory as opposed to graphics memory, so the outputs need to be offered (e.g., returned as call outputs) to the programmer via the AAPI interface. Thus, not only does the AI create AcMDPAs from conventional data structures, the AI also creates conventional data structures from AcMDPAs and returns them as outputs. For example, an AcMDPA can be exported to an array. The type of the array elements and rank and dimensions will correspond with those of the source AcMDPA. Additionally, when an AcMDPA can be viewed as two dimensional arrays with RGB values, the AcMDPA can be converted to a bitmap output.

In the following example, void Export(AcMDPA<T> acs, out <T>[,] rgt), a new T array of the same dimensions as acs is created and whose values are set to be those of acs. In the next example, void Export(AcMDPA acs, out Bitmap bmp), acs is a 2 dimensional quadfloat AcMDPA, and a new bitmap is created with the same dimensions as acs but whose values are the quad float values of acs.

AcMDPA Operations

A number of operations can be provided via the AAPI for requesting parallel processing of AcMDPAs. Any indication of syntax (or language tokens) in this specification whether they are data types, methods or operations, or properties are purely to provide explanations of possible constructs and actions. The purpose is to provide examples of possible functionality for providing Accelerator parallel programming scenarios via the AAPI.

Descriptive Properties

The .NET Framework is a computing platform (defined by an ECMA standard) that simplifies application development in various environments, such as in the highly distributed environment of the Internet. In one example, to be consistent with NET arrays, a rank and a get length operations is define as follows, Rank( ) returns the number of dimensions in the AcMDPA, and GetLength(int i) returns the number of elements in the ith dimension.

Additionally, if an example follows the .NET convention, all indices will be familiar to a high-level programmer if they are zero based. The ranks of an array can be numbered starting with zero, as well. However, in another example, the indices and rank will vary. In one example, non-zero starting offsets are provided for each dimension.

Arithmetic Operations

There are many operations that can be offered on AcMD-PAs. For example, there are many arithmetic operations that can be offered on AcMDPAs of the same shape. For example, an arithmetic operation can be performed between corresponding elements of two AcMDPAs, with the corresponding elements of the AcMDPAs as operands for the arithmetic operation. These operands and the operator can be viewed as instances of an element-wise map. For example, the mapping is defined as, Map(op,AcMDPA<T> acs1, . . . , AcMDPA<T> acsn, out AcMDPA<T> acsOut)

The arithmetic operation returns in acsOut the AcMDPA made up of the element-wise operation, acs1 <op> acs2 <op> . . . <op> acsn. In one example, the supported arithmetic operations (i.e., <op>) are as shown in the following Table B.

TABLE B

| Unary | |
|---|---|
| Abs | absolute value |
| Rcp | reciprocal |
| Negate | reverse sign |
| Cos | cosine |
| Sin | sin |
| Log | logarithm base 2 |
| Sqrt | square root |
| Binary | |
| Add | addition |
| Sub | subtraction |
| Mul | multiplication |
| Div | division |
| Min | minimum |
| Max | maximum |
| Ternary | |
| Cmp | interleave 2 MDPAs guided by a third (acs1 > 0) ? acs1:acs2 |

It is worth noting that, although there are some cases where element-wise operations between AcMDPAs of different shapes may be desirable, these are typically cases where the smaller AcMDPA is expanded to the size and shape of the larger.

Just as it is desirable to convert from floats to integers in standard numeric computation, it is also desirable to convert between float AcMDPAs and integer AcMDPAs. To handle this, element-wise conversions are provided as follows, void    ConvertTypes(AcMDPA<T>    acsin,    out AcMDPA<S> acsOut)

When converting to integers from floats, two methods are provided as follows,

AcIntegerMDPA Floor(AcFloatMDPA acfs), which takes the floor of each element in acfs and AcIntegerMDPA Ceiling(AcFloatMDPA acfs), which takes the ceiling of each element in acfs. Another method could provide rounding of floats to integer.

In another example, the OuterProduct of two AcMDPAs is the product of all pairs of elements of the two MDPAs, and the method is defined as, void Outer(op, AcMDPA acs1, AcMDPA acs2), where if acs1 is of shape $(i_0, \ldots, i_{n-1})$ and acs2 is of shape $(j_0 \ldots j_{m-1})$ then the result is of shape $(i_0, \ldots, i_{n-1}, j_0, \ldots, j_{m-1})$. In the resulting MDPA the value in $(i_0, \ldots, i_{n-1}, j_0, \ldots, jm)$ is acs1 $(i_0, \ldots, i_{n-1})$*acs2$(j_0, \ldots, j_{m-1})$.

A similar mapping is defined for InnerProduct, as follows, void Inner(op1, op2, AcMDPA acs1, AcMDPA acs2)

where, the InnerProduct of two one-dimensional AcMDPAs of the same length is the sum of the pairwise product of the elements of the AcMDPAs. This can be generalized to any two binary operators and conformal AcMDPAs of shape $d_0 x \ldots x d_{n-1}$ and $r_0 x \ldots x r_{m-1}$ where $d_{n-1}=r_0$. The result is an AcMDPA of shape $d_0 x \ldots x d_{n-2} x r_1 x \ldots x r_{m-1}$ where the element in position $i_0, \ldots, i_{n+m-2}$ is, $$\Sigma_{i=0}^{dn-1} a_{i0, \ldots, in-2, i} * b_{i, in, \ldots, in+m-2}$$

and if op1 is addition and op2 is multiplication. In the case of 2 dimensional AcMDPAs, this is matrix multiplication.

Logical Operations

Various logical operations can be provided for AcMDPAs using the AAPI. In one such example, these logical operations are maps that compare two MDPAs, element-by-element and return true false values, as follows, void Map(logicalop, AcMDPA<T> acs1, AcMDPA<T> acs2, out AcBoolMDPA csOut) For example, logical operators such as greater than, less than, greater than or equal, less than or equal, equal, and not equal can be supported (e.g., GT, LT, GE, LE, EQ, NE).

Scalar Reduction

In an example scalar operation, the values in an AcMDPA are combined to form a single scalar value. The supported set of reduction operators are preferably commutative and associative operators, void Reduce(op, AcMDPA<T> acs1, out <T> tReduction)

where op comprises such operators as +, *, Max, and Min. These reductions return the sum of all elements, the product of all elements, the largest and the smallest element, respectively. In one example, scalar reductions of the subsets of an AcMDPA can be accomplished by combining the below discussed section functionality, with these scalar reductions.

Partial Reduction

It is desirable to provide reductions across a single dimension. For example, the row-sum or column-sum of an AcMDPA is a partial reduction. Given an AcMDPA of n dimensions, the result of a partial reduction is an AcMDPA with fewer dimensions, for example, one fewer dimension. In one example, if an input (i.e., acsIn) is an AcMDPA of shape $d_0 x \ldots x d_{n-1}$ and an addition reduction is requested along the $k^{th}$ dimension, then, the call would be defined as, void Reduce(op, int iDimension, AcMDPA<T> acsIn, out AcMDPA<T> acsOut) and the call returns an AcMDPA of shape $d_0 x \ldots x d_{k-2} x d_k x \ldots x d_{n-1}$, where acsOut$[i_0, \ldots, i_{k-2}, i_k, \ldots, i_{n-1}] = \Sigma_{j=0}^{dk-1}$ acsIn$[i_0, \ldots, i_{k-2}, j, i_k, \ldots, i_{n-1}]$, for the case when op is addition. In one such example, an interpreter supports the same operations as those defined for reductions (i.e., +, *, Max, and Min).

Section Operator

A section operator is used to assemble a new AcMDPA from specified parts of another AcMDPA. In general, the new AcMDPA will be, in some sense, smaller than the original.

To select a portion of an existing AcMDPA, a programmer specifies a start index, a count, and a stride. For example given a one dimensional source AcMDPA, defined as A=(2, 4, 6, 8, 10, 12, 14, 16, 18, 20, 22), a new AcMDPA of three elements (count) can be created by section. For example, by selecting the first element (start index), and taking every second element thereafter (stride), until three elements are selected (count), the new AcMDPA is created. This examples produces an AcMDPA comprising (2, 6, 10). In one example, the section is defined using an array. For example, a section is defined by the array (0, 3, 2), to indicate the following corresponding inputs (start index, element count, stride distance). Thus, this could also be written as (2, 6, 10)=Section (A, (0, 3, 2)). In another example, a reverse order is provided by using a negative stride from the start index. In the general case, a section operation defines a (start, count, stride) array for each dimension in the original AcMDPA. The following provides an example section call, void Section (AcMDPA <T>acs, int[ ] rgiSection, out AcMDPA<T> acsOut)

where rgiSection has length acs.Rank*3. For example if A is the following two dimensional array, 2 4 6 8 10

1 3 5 7 9, then a subsection section request defined as (1, 1, 0, 0, 3, 2) would create a new sub-AcMDPA of (1, 5, 9). This new sub-AcMDPA is created by taking the three elements, starting with the first and taking every other one (0, 3, 2) from the second row (1, 1, 0) of A. Although this example notation is certainly not required, it allows the creation of a rich set of sub-AcMDPAs. In another example, a potentially more syntactically friendly language could include methods for selecting corners, single planes, or other sub-AcMDPAs requests. For example, in order to drop a dimension, the following call is defined, void DropDimension(AcMDPA<T> acs, bool[ ] rgfToDrop, out AcMDPA<T> acsOut)

In this drop dimension example call, if acs has rank n, rgfToDrop has n elements. The resulting AcMDPA has dimension n-k where k is the number of true values in rgfToDrop. The meaning of a true value in the ith position of rgfToDrop is to drop the ith dimension, provided that dimension has size 1. If that dimension does not have size 1, nothing is dropped.

Conversely, a dimension is added with the following call, void AddDimension(AcMDPA<T> acs, int iNewDimension, out AcMDPA<T> acsOut).

In this add dimension call, if acs has Rank n, then the resulting AcMDPA has rank n+1. In the resulting AcMDPA, the iNewDimension$_{th}$ dimension has size 1.

Replication Operators

A replication operator promotes a smaller AcMDPA to a larger one. These can be helpful in creating operands for some of the arithmetic operations described above. These all are based on the idea of tiling. Given a small MDPA, a method is provided for replicating the AcMDPA to create a new possibly larger AcMDPA of the given dimensions. In one example, a replication operation is defined as,

| | |
|---|---|
| void Replicate(AcMDPA<T> ascIn, | // the input array |
|  int[ ] rgiDimensionsOut, | // the j$^{th}$ entry in rgiDimensions is the size // of the j$^{th}$ dimension in the output array |
|  out AcMDPA<T> acsOut) | // the return MDPA |

The output AcMDPA, ascOut is a truncation/replication of ascIn where ascOut[$i_0, \ldots, i_{n-1}$]=ascIn[$j_0, \ldots, j_{n-1}$] where $j_k$ is defined as follows:

$j_k = i_k$(mod $ascIn$.GetLength($m$)) where $m = k$ mod (Rank(ascIn)).

For example, given an initial AcMDPA, acsIn, as input, 2 4 6

1 3 5, and a desire to create a 3×2 array as follows, 2 4

1 3

2 4, the request is specified as Replicate(acsIn, (3, 2), out acsOut). This is different from Section in that Section is designed to create a smaller AcMDPA and it does so by choosing a regular subset of values along each dimension. Replication supports the idea of repeating a given AcMDPA along various dimensions.

Additionally, an expand operator (not shown) receives an AcMDPA as input, and makes it larger by adding dimensions to it. For example, a two dimensional AcMDPA can have a third dimension added, by adding one (or many) planes to it. This could be provided by adding an existing plane from the same or another AcMDPA, or adding constants or other stated values in the plane. This is helpful for many purposes, such as for preparing non-conforming AcMDPAs for performing other binary operations.

Permutation Operations

In addition to reshaping AcMDPAs by section and replication, operations are provided for permuting the dimensions. In one example, a multi-dimensional analogy of a transpose of a 2-dimensional matrix is provided. In one example, a permutation operation is specified by an integer AcMDPA that lists the new order of dimensions. In one such example, a dimension order of (2, 0, 1) applied to a 3 dimensional input AcMDPA specifies that the value at the location ($i_0, i_1, i_2$) in the original AcMDPA, ends up in the ($i_2, i_0, i_1$)$^{th}$ location in the new AcMDPA. A simple 2-dimensional transpose is specified by the AcMDPA order (1, 0). In one example, a call is defined as, void PermuteDimensions(AcMDPA<T> acsSource, int[ ] rgiDimensions, out AcMDPA<T> acsOut), where acsSource is an n-dimensional AcMDPA of any type, and acsDimensions is an integer array of length acsSource.R- ank whose values are the integers from 0 to n−1, in any order, $(i_0, \ldots, i_{n-1})$. The resulting AcMDPA is an n-dimensional AcMDPA where the value acsSource($j_0, \ldots, j_{n-1}$) is at location $(j_{i0}, \ldots, j_{in-1})$ Scatter/Gather Operations Section provides a way to retrieve data from contiguous or uniform-stride locations in an AcMDPA. However, it may be helpful to retrieve data from non-contiguous locations, so an operation called gather is provided.

For one example, the gathered elements are assembled into a one dimensional AcMDPA. To gather "n" distinct elements from a d-dimensional AcMDPA, called acsSource, the following method is demonstrated, void Gather(AcMDPA<T> acsSource, int[,] rgiIndex, out AcMDPA<T> acsOut), where rgiIndex is a 2-dimensional AcMDPA of shape n×d. In this example, the $i^{th}$ row of acsIndex contains the indices in acsSource of the $i^{th}$ element in the output AcMDPA.

For example, if acsSource is a 1-dimensional AcMDPA, comprising the following elements, 5 6 3 4 2 1, and rgiIndex is defined as,

5

3

1, then the resulting Gather produces an AcMDPA comprising, 1 4 6.

In this example, the $6^{th}$ element of acsSource is 1, the $4^{th}$ element is 3, and the second element is 6.

In the general case, an output AcMDPA can be of multiple dimensions. Here the indices, in addition to specifying which elements to select, also determine where the element is placed in the output AcMDPA. (Note that this is true in the one dimensional case, as well.) In another example, a gather operation receives an AcMDPA containing the source data and an array that indicates the indices of data (e.g., an index array or "conformal" array) requested from the source. The shape of the index array also determines the shape of the output AcMDPA. For example, suppose the source AcMDPA, acsSource, has 3 dimensions of size 5, 6 and 7. Suppose data is desired from acsSource at positions (2, 4, 6), (2, 5, 6), (1, 3, 5) and (3, 2, 1) to be gathered into a 2 dimensional AcMDPA. In one example, the indices are specified by the following integer AcMDPA of dimensions 3×2×2, 2 2
1 3
4 5
3 2
6 6
5 1

The result of this Gather is the 2×2 AcMDPA whose elements are laid out as follows, (2, 4, 6)  (2, 5, 6)

(1, 3, 5)  (3, 2, 1)

Another example gather request is defined as, void Gather(AcMDPA<T> acsSource, System.Array rgiIndex, out AcMDPA<T> acsOut), where acsSource has shape $(d_0, \ldots, d_{n-1})$, and acsIndex is a k+1 dimensional integer AcMDPA of shape $(e_0, \ldots, e_{k-1}, n)$. The output is a k dimensional AcMDPA where the $(i_0, \ldots, i_{k-1})$ element is acsSource[acsIndex($i_0, \ldots, i_{k-1}, 0$), $\ldots$, acsIndex($i_0, \ldots, i_{k-1}, n-1$)].

Scatter does the opposite of a Gather. Scatter takes an AcMDPA of values and writes them into noncontiguous locations in a second AcMDPA. For each element in the source AcMDPA, the indices indicate the destination in the results AcMDPA. For example, when acsSource is one-dimensional, the elements are distributed from the source AcMDPA into a n-dimensional AcMDPA, acsDestination. The call specifies the indices in acsDestination for each element in the source, as follows, void Scatter(AcMDPA<T> acsSource, int[,] rgiindices, out AcMDPA<T> acsDestination), where rgiIndices is 2-dimensional, and where the $i^{th}$ 'row' of rgiIndices is the coordinates in acsDestination for the $i^{th}$ element in acsSource.

For example, if acsSource is one dimensional, 3 5 6 4 2 and acsIndices is 5×1

0 1 7 4 5 then acsDestination looks like 3 5 * * 4 2 * 6 * . . .

where * indicates that the value is unchanged by the Scatter.

In the general case, of an n-dimensional source AcMDPA, the operation provides analogous behavior. For example, the index array has one more dimension than the source. Given, the following 2×3 source AcMDPA, 3 4 5

6 7 8 in order to scatter the 6 elements (sparsely) into a 4×5 destination AcMDPA, as follows, 4 7 * * *

5 * * * *

6 * 8 * *

3 * * * *

* * * * *, an index AcMDPA is specified as follows, $$\begin{matrix} 3 & 0 & 1 & & 0 & 0 & 0 \\ 2 & 0 & 2 & & 0 & 1 & 2 \end{matrix}$$

For example, 5 in the source AcMDPA (from the $0^{th}$ row and $2^{nd}$ column) goes to the $1^{st}$ row and $0^{th}$ column of the resulting AcMDPA. Thus the index AcMDPA has a (0, 0, 2) value of 1 for the second row of the result and a (1, 0, 2) of 2 for the $0^{th}$ column of the result.

The following is an example method call for scatter,
    void Scatter(AcMDPA<T> acsSource, System.Array rgiIndices, out AcMDPA<T> acsDestination)

Let acsSource be of shape $(s_0, \ldots, s_{n-1})$ and acsDestination have shape $(d_0, \ldots, d_{k-1})$, then rgiIndices is an integer array of dimensions $(s_0, \ldots, s_{n-1}, k)$. Thus, the element in acsSource$(i_0, \ldots, i_{n-1})$ is copied into acsDestination(rgiIndices$[i_0, \ldots, i_{n-1}, 0], \ldots,$ rgiIndices$[i_0, \ldots, i_{n-1}, k-1]$). Finally, when there are collisions in the destination on the scatter, the results can be defined or remain indeterminate. For example, the winning value can be predetermined by an ordering imposed on the input AcMDPA, the output AcMDPA, etc.

Shifting Operations

It is desirable to allow a programmer to request element shift operations in parallel programming. Operations for uniformly moving the elements in an AcMDPA, are provided, for example, so they can be used as argument in an operation. For example, in a 1-dimensional AcMDPA, to compute the sum of an element and its right an left neighbors, a left-shifted copy and a right-shifted copy are provided. For example, three basic operations of this kind are shift, rotate and pad.

Repetition is sometimes helpful to the reader. As with all operators discussed herein, variations of these operations can be imagined and offered by those of ordinary skill in the art once these general topics are covered, and these variations are considered within the scope of this discussion. Further, and as stated before, if desirable, the source AcMDPAs remain unchanged, and output AcMDPAs contain results.

For example, when shifting, the source AcMDPA may remain unchanged, and the results are provided in an output AcMDPA. A shift offset is specified, and the empty elements caused by the shift or otherwise remaining in an output AcMDPA get may receive specified values. For example, a few shift methods are specified as follows,
    void Shift(AcMDPA< > acs, int[ ] aiShift, float flDefaultVal, out AcMDPA<T> acsOut)
    void Shift(AcMDPA<T> acs, int[ ] aishift, int iDefault, out AcMDPA<T> acsOut)

In one such example, acs is an input AcMDPA, aiShift is an array of shift values—the $i^{th}$ member specifies how many places to move the $i^{th}$ dimension. A positive shift value element is a shift to the right, and negative shift is a shift to the left. In this example, the output AcMDPA is the same shape as acs.

More precisely, if acs is k-dimensional and has shape $n_0 \times \ldots \times n_{k-1}$ and acsOut is the output AcMDPA, then for each $0 \leq i < k$, $acsOut[\ldots, x-aiShift(i), \ldots]$ is $acs[\ldots, x, \ldots]$.

If $x-aiShift(i) \geq n_i$ or if $0 > x-aiShift(i)$, then $acsOut[\ldots, x-aiShift(i) \% n_i, \ldots]$=flDefault.

In the preceding sentence we specified that when a shifted index, $x-aiShift(i) \% n_i$, falls out of range in the resulting AcMDPA, the value used is a specified constant. However, in image processing it may be desirable to use a boundary value. If a boundary values is used instead of a specified default—the value in the $0^{th}$ position of acs is used if aiShift(i) is positive and the value in the $n^{th}$ position is used if aiShift(i) is negative. This is known as "clamping". In one example, shifting with clamping is performed by the following method call,
    void Shift(ACMDPA<T> acs, int [ ] aiShift, out AcMDPA<T> acsOut).

Rotate Operations

Rotate is very similar to a Shift operation, except that values in the source AcMDPA are shifted into the empty spots in the new AcMDPA. An example signature for providing a rotate operation is defined as follows,
    void Rotate(AcMDPA<T> acs, int [ ] aiShift, out AcMDPA<T> acsOut).

In this example, if the source acs is k-dimensional and has shape $n_0 \times \ldots \times n_{k-1}$, acsOut is the output, and for each $0 \leq i < k$, acsOut$[\ldots, x-aiShift(i) \% n_i, \ldots]$ is acs$[\ldots, x, \ldots]$.

Pad Operations

In general, referencing an element outside of an AcMDPA may result in a fault. However for ease of notation, it is often desirable to have indices refer to elements outside of the an AcMDPA with the assumption that those out-of-bounds elements will be of a specified fixed value or that the out-of-bounds dimension will wrap. A programmer can set up this behavior with an example Pad operator,
    void Pad(AcMDPA<T> acsIn, int[ ] aiBefore, int[ ] aiAfter, float fl, AcMDPA<T> acsOut)

For example, if acsIn has n dimensions, aiBefore and aiAfter each have n elements. In this example, aiBefore(j) is the number of additional elements to add before the $j^{th}$ element, aiAfter(j) is the number to add after. Further, fl is the value assigned to these "new" elements. If acsIn has shape $(i_0, \ldots, i_{n-1})$ then the result of Pad has shape $(i_0+aiBefore(0)+aiAfter(0), \ldots)$.

To allow a pad with wrapping, an example operator is provided,
    void Expand(AcMDPA<T> acsIn, int[ ] aiBefore, int[ ] aiAfter, AcMDPA<T> acsOut)

In this example, any AcMDPA access to what was out-of-bounds in acsIn, is taken to be the value of the index modulo the length of the dimension. The resulting AcMDPA has the same rank as acsIn, however each dimension has size acsIn.GetLength(i)+aiBefore[i]+aiAfter[i].

Other Operations

Various other operations are other operations may be desirable for various programming scenarios such as Concatenation, Ravel, APL-Replication, Reverse, and Random Number Generation. For example, concatenation is the appending of one AcMDPA to the end of the other across the last dimension. Ravel provides the elements of an AcMDPA in a canonical order, such as ascending, descending, etc. APL-Replication allows the user to specify the number of copies of subsections of the AcMDPA to repeat in an output AcMDPA. Reverse provides a reordering of the elements in an AcMDPA. Random Number Generation generates AcMDPAs of random numbers, for example, by generating an array of random numbers and converting it to a AcMDPA.

Libraries

Some operations are better suited for libraries (e.g., DLL) while others are better supported directly within an interpreter or compiler. These are merely performance considerations but value is added by performance. In this considerations, basic operations have several criteria that may distinguish them from library functions.

1. They more are likely to be supported directly by hardware.
2. They are core operations upon which other operations may be built.
3. They are commonly used and important for a wide class of applications.

On the other hand, libraries may contain simulated (or potentially simulated) operations, complex operations which are common to many applications.

Based on these possible criteria, AcMDPAs of complex numbers and AcMDPAs of quaternions seem to be good candidates for libraries. In this category are also standard operations on matrices and numerical methods.

Signal Compiler/Interpreter

Parallelism is indicated to the compiler or interpreter by a programmer using an AcMDPA data type instead of a standard array. Of course, this request could also be implicit based on the nature of the operation or repetitive nature of the request. Additionally, other language constructs may explicitly or implicitly signal the compiler to generate parallel code. In one example, parallel looping constructs are exposed in the AAPI interface designed specifically for AcMDPAs, and/or standard array types. In one such example, the constructs free the programmer from having to find indices or from having to express iterative operations. This allows the interpreter to provide efficient parallel processing solutions to other problems.

Example .NET Extensions

In one example, AcMDPAs are provided as an extension to the .NET array class. Although there is certain naturalness to extending the familiar array class, it might add confusion. Thus, in another example, the AcMDPAs are supported separately from the .NET array class. For example, the functionality could be provided as a separate programming language, in a dynamically linkable library, etc.

Example Efficient MDPA Coercions

One of the additional benefits of providing abstract high-level programming language constructs (e.g., AcMDPA) is that an interpreter (e.g., Accelerator Interpreter) manages resources and organizes calls to underlying graphics resources (e.g., DirectX®, OpenGL®, Cg®, HLSL®, etc.). This allows interpreter designers to create and manage directed acyclic graphs (e.g., DAGs) that represent resource requests waiting to be run on the underlying graphics processing unit.

Figure 5:
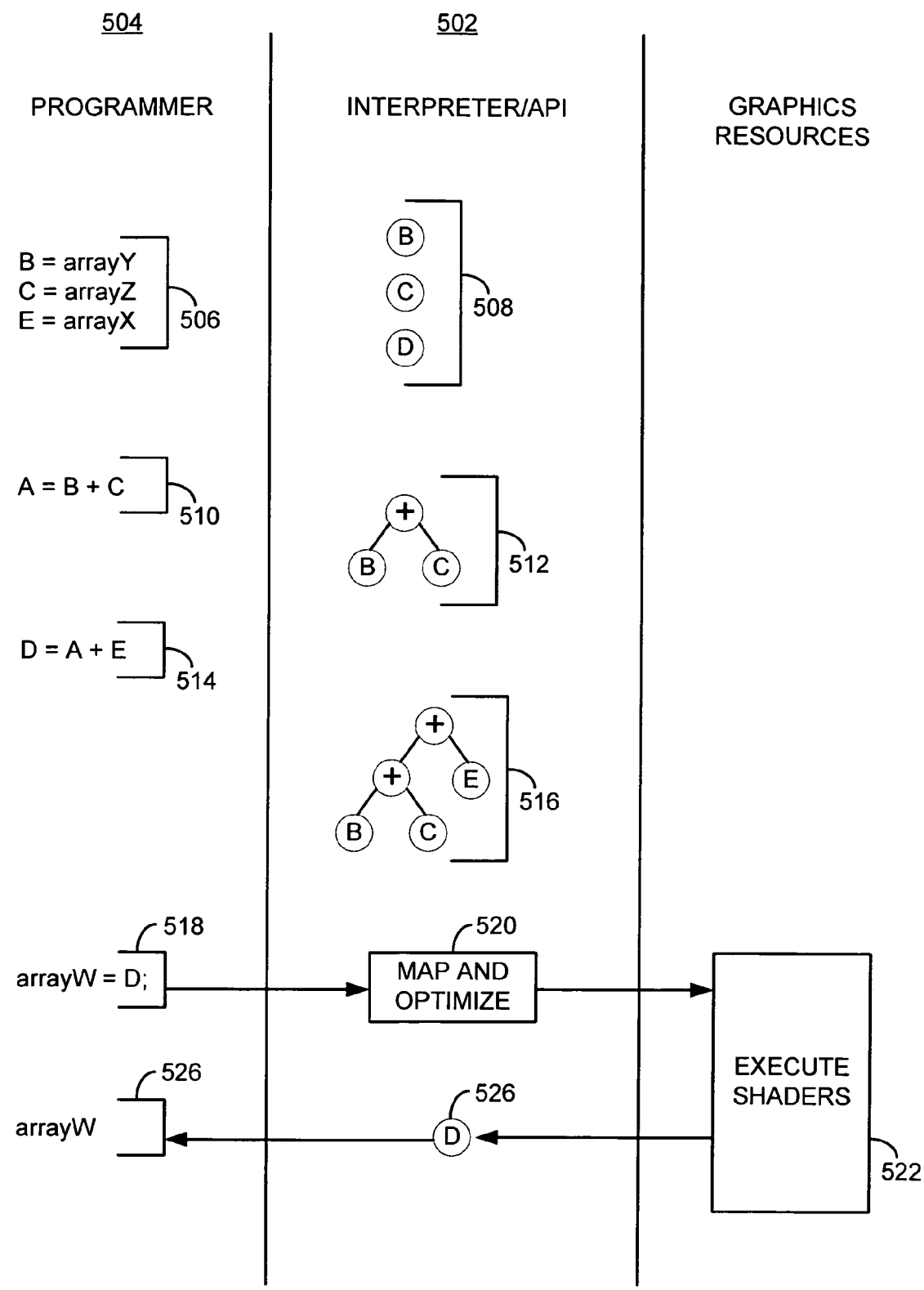
FIG. 5 is a diagram illustrating an example interpreter for managing graphics processing for general purpose parallel processing requests.

FIG. 5 is a diagram illustrating how an example Interpreter and/or API efficiently manages graphics processors for general purpose parallel processing requests. As shown in one example, a high-level programmer 504 defines several MDPAs (i.e., B, C, and E) by assigning standard arrays (i.e., arrayY, arrayZ, and arrayX) to MDPA identifiers 506. In another example, more consistent with the AcMDPAs defined above, an explicit creation operation is used to create MDPAs. Once created, the interpreter maintains references to these assignments 508.

Next, the source code (e.g., C#, C++, etc.) (once compiled and running) requests an operation to be performed 510 on two MDPAs. The interpreter determines that no evaluation is required since there is no use yet required for output of the operation. Thus, the interpreter 502 builds a data structure, such as a tree or graph, representing the defined relationship 512, and waits. Again, the source code requests another operation 514, and the interpreter again delays computation, but builds the relationship 516 since no use is yet required.

The interpreter builds a relationship 516 of MDPAs and the associated operations requested in the source code. In one example, these relationships can be stored in memory 512, 516 as directed acyclic graphs (e.g., expression DAGs).

In one example, the interpreter builds an expression but delays translating the operations and relationships, and delays copying the operands (e.g., MPDAs) and operators (e.g., shader programs) to parallel memory for processing. Thus, in one example, the interpreter returns a reference to a programmer representing an expression DAG that has not yet been converted (completely) to a shader DAG or copied to graphics memory yet. The interpreter provides the MDPA datatypes and operations as parallel processing abstract data types, and the programmer expects that these abstract data types are being processed by the graphics processor. Thus, copying of these MDPAs to graphics memory can be delayed until a result is required in the form of a standard language array 518. Of course, before the result is required or requested, the interpreter is free to create a shader DAG and or optimize that shader DAG so it will be ready for executing on the parallel processor when needed.

Once the source code requests a result that requires some use of the result 518, the interpreter builds a DAG of shaders 520 for the requested operations, optimizes this DAG of shaders, loads the shaders in graphics memory, and directs the GPU to execute 522 the mapped shaders in order to provide parallel processing. The interpreter then retrieves the shader processing results from graphics memory 526, and converts the parallel processing results back to a standard language array 526.

Thus, the interpreter binds MDPAs to expression DAGs, and when a conversion is requested back to a standard array, the interpreter is required to produce and deliver the parallel processing result 526. This gives the interpreter designer the freedom to manage the order of how an expression DAG is evaluated and/or optimized 520. For example, an interpreter would evaluate an expression DAG by building a shader DAG (e.g., with the fewest number of shaders (nodes). This efficiency analysis would include resource constraints of the shaders along with GPU and graphics memory constraints.

This "delayed coercion" of data from standard arrays to graphics textures and back to standard arrays provides an interpreter designer the opportunity to manage graphics processing efficiently. The building of a shader DAG allows optimizations specific to the shader language used.

Example Expression DAG

A pixel shader is a program created in a highly constrained graphics programming language, somewhat similar to assembly language programming language, at least visually. For a given graphics card, there is often a limited number of instructions that can be in a shader program, a limited number of registers, a limited number of times you can use each register, and there is typically no looping allowed in the shader program instructions. Thus, the goal is to receive parallel processing requests and automatically create shader programs that fit the constraints of a given graphics programming environment. In one such example, an interpreter programs an arbitrary expression into a series of instructions that are then executed on a parallel processor. Thus, a graphics processor is employed on-the-fly at runtime by an interpreter to evaluate an arbitrary expression received via Accelerator type language constructs provided to applications programmers.

An expression DAG is created based on calls made according to the Accelerator language constructs. This expression DAG (e.g., eDAG) is converted to a shader DAG (e.g., sDAG) and the shader programs represented by the sDAG are loaded and run on the graphics card in order to evaluate the eDAG.

Figure 6:
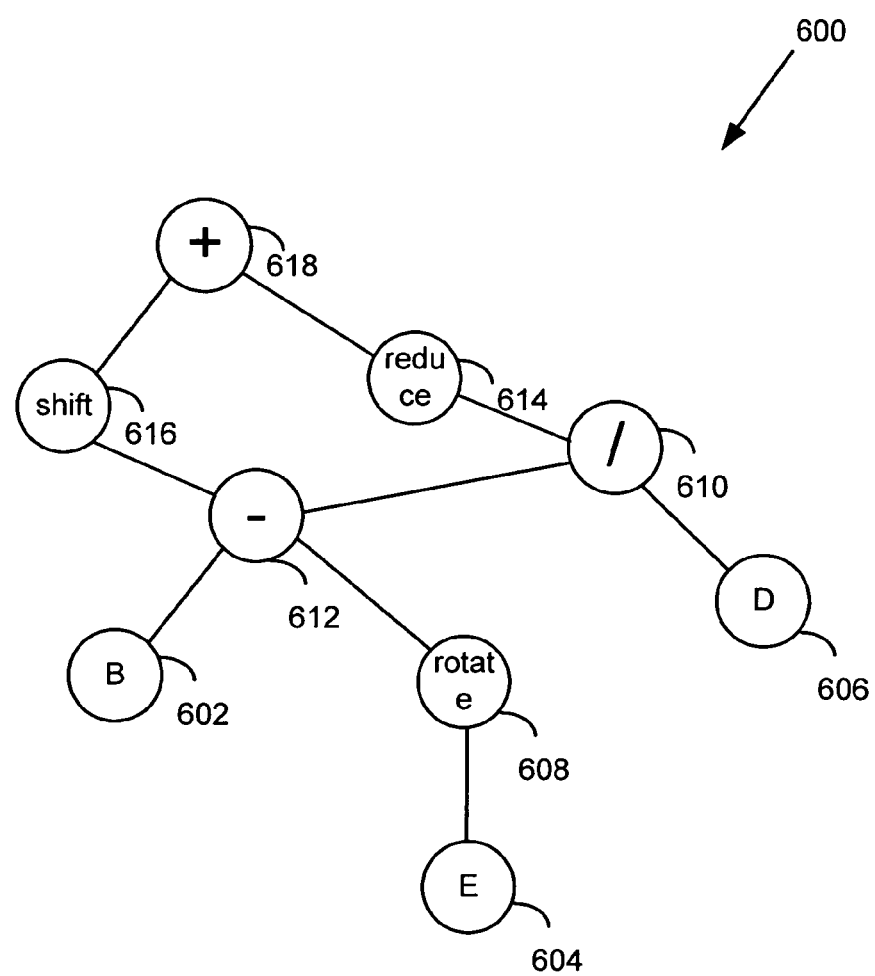
FIG. 6 is a diagram of an example expression comprising a directed acyclic graph.

FIG. 6 is a graph of an example expression data acyclic graph. Of course, one of ordinary skill in the art could store the expressions and resulting shader programs in other data structure formats without departing from the described technology. Applicants describe them as graphs since graphs are a standard way to represent expressions and they provide an efficient way to support automated programming of a parallel processor and the various optimizations thereof. The example eDAG 600 includes three input multi-dimensional data parallel arrays 602-606, and six operations thereupon 608-618. Due to various constraints, such as resource constraints of a specific graphics environment (e.g., hardware limitations, lack of an accumulator, lack of looping, inability to write to temporary memory, etc.), an eDAG may need to be broken into or represented by two or more shader programs.

A decision to divide a larger part of a shader program into two (or more) shader programs is called a shader break. For example, the interpreter may assemble a sequence of parallel processing instructions capable of performing operations represented by the input expression. In one such example, the sequence is broken down into two or more shader programs (e.g., nodes of an sDAG) for execution on the GPU. In another example, an eDAG can be broken at various places, for example, based on characteristics of the shader program, size changes for inputs or outputs (e.g., MDPAs), or resource constraints of a graphics environment, etc.

An expression DAG 600 illustrates how MDPAs and related inputs and corresponding operations can be represented in memory.

When a tree is evaluated using the graphics processing unit, the interpreter creates or selects a shader program. For example, an interpreter maps a reduce operation 614 to plural parallel processing instructions and or to a series of specific graphical programs (not shown) that perform the operation when executed on the parallel processor.

The interpreter then loads the shader program and input operands into graphical memory, and instructs the GPU to execute the loaded program. The graphical processing unit is efficient because it performs the operation on many elements within the MDPAs in parallel, thereby processing this request much faster than could be performed by the CPU using sequential computation.

As the expression DAG 600 grows larger, it becomes more critical to manage graphical processing. For example, graphical memory will typically hold only a limited number of textures or shader programs at any given time. The limited resources are typically the available memory for textures, the number of available registers, and the instruction count. Thus, the interpreter builds a shader DAG that adheres to these constraints. Once these resource considerations are determined, the interpreter evaluates the DAG by loading programs into graphical memory and invoking the GPU Example Shader Program and Associated Textures A texture in the GPU environment is similar to an array in the CPU environment. For example, a two dimensional array has rows and columns with values within the rows and columns. The values of the array can be placed in a texture based on a spatial relation. And unlike a CPU, a GPU can process texture elements in parallel. The GPU operates on the textures in parallel and that quality is harnessed to provide parallel processing on arrays when arrays are provided to a graphics processor as textures.

Figure 7:
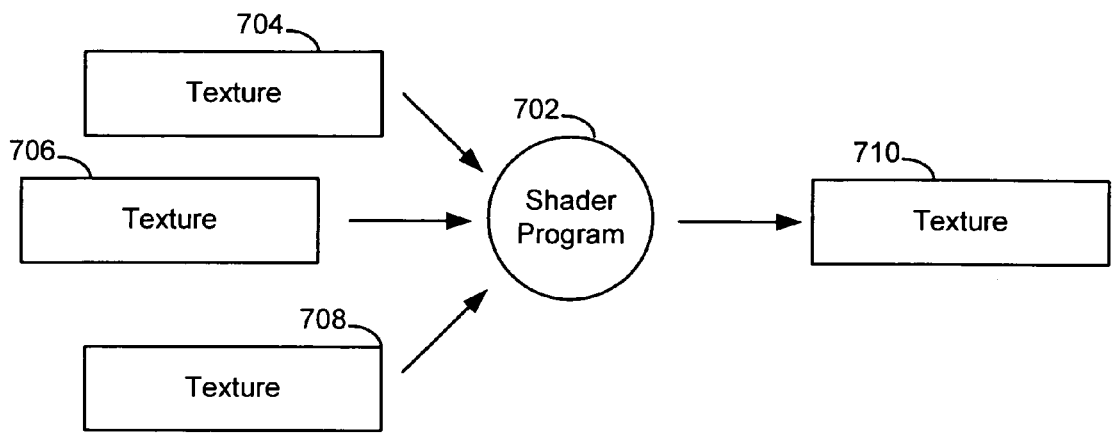
FIG. 7 is a block diagram of an example shader program and its associated texture inputs and output.

FIG. 7 is a block diagram of an example shader program and its associated texture inputs and output. A shader program (e.g., pixel shader) 702 utilizes textures as inputs 704-708 and provides one texture as an output 710. Typically, there are one or more input textures, although some instructions require no input textures. The pixel shader program computes a value for each output location in the output texture. The pixel shader program has access to the x and y coordinates for a 2D output texture (x, y, z, for 3D texture, etc.), and has access to input textures in several ways. For example, the shader program can compute a location in the input texture at which to retrieve a value, or it can use a hardware computed transformation on the output locations to determine the input texture address. In another example, there are one or more transformations associated with a texture input, and the transformations indicate where to fetch values from an input texture as inputs to an operation.

Additionally, the transformations may also be represented in terms of explicit computations of location information. The shader program receives the input texture(s), along with any input constants or other information such as a transformation that indicates what value should be taken from the texture (via the transform and used to compute the output texture). For example, the output location is determined by an identity transformation placed in a default texture coordinate register. Focusing texture computations based on the coordinates of locations in the output texture often requires creating several shaders to perform a desirable operation. Also, certain computations can not be done in a single shader program. Thus a texture output from one shader program, often serves as an input texture to a next shader program.

Example Three Pass Shader DAG Construction

Figure 8:
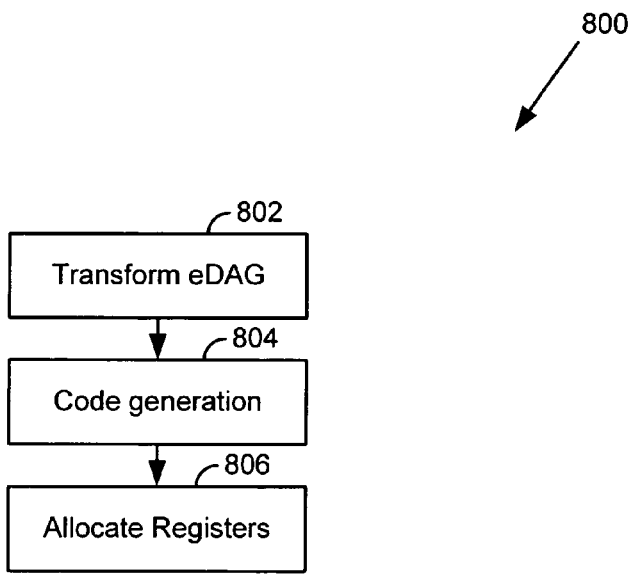
FIG. 8 is flow chart of an example method of constructing a shader DAG from an expression DAG.

FIG. 8 is flow chart of an example method 800 of constructing a shader DAG from an expression DAG.

Pass 1

At 802, transformations are performed on the expression DAG. For example, an expression tree can be analyzed and manipulated to collect information that can be used to generate more efficient code. In one example, the interpreter walks the expression tree twice (e.g., pass 1 and 2). Breaks are marked for any parameter nodes if the parent operation must access the parameter data in more than one location. This occurs, for example, with reduce, outer product and inner product operations. Further, any operation with an output of different size from its input must be the last operation in a shader. Such operations include reduce, inner product and shape changing texture coordinate operations such as section, replicate and expand. Further, a break is forced along paths in the expression tree that go through multiple texture coordinate operations, even if they don't change sizes. For example, a node can be marked for break if it is a texture coordinate operation and it has a descendent that is a texture coordinate operation. As described later, in an optimized version, texture coordinate operations are combined into a composed texture read and moved to take effect as a read at a leaf. The various kinds of breaks and how they impact the expression DAG during shader generation is described further later 900.

Pass 2

On the second pass, expensive common sub-expressions (described later) are marked. This allows a common sub expression to be evaluated once and the result reused.

Code Generation

At 804, shader code is generated. The nodes of an expression DAG are program objects that provide and return shader code that corresponds to graphics programming instructions required to obtain the value represented by that node. Optionally, nodes of an expression DAG, comprise program objects that provide and return shader code that corresponds to a graphics programming language instruction set, selected from two or more graphics programming languages, based upon a graphics programming language determined to be supported by the resident environment. In a specific graphics programming environment, there are several possible constraints on size of shader programs. For example, shaders often have a limit on the number of each kind of register, the number of instructions they may contain, and a shader can typically have only one output texture. The eDAG nodes, are traversed in a post-order fashion where each child delivers to its parent the shader that computes its value and the register in which the result value resides. In this post-order traversal, each parent node is responsible for combining its own shader code with that of its children to produce a small number of shaders that evaluate the expression DAG. If a child node is marked (e.g., a shader break) as requiring a separate shader, a sampler register is allocated. The sampler register is used to read the output texture produced by the child. The parent then adds code to itself to sample the register for the parents input. A shader typically returns only one value (e.g., a texture), so two children are not usually combined into the same shader unless the parent can be combined in the same shader as well. Thus, each child is examined by its parents to see if that child can be combined with the parent, along with any other children already combined with that parent. If the child can be combined, the child shader will be appended with the parent code. Once the children have been examined, the parent code is added to the present shader along with zero or more child shaders. The number of instructions that an operation will add to a shader are pre-computed (for estimation purposes), along with the number of additional registers of each kind that will be required by the operation. If this estimate of the number of registers exceeds a limit, a register allocation pass is done to determine the actual number. If appending the operation would exceed a resource limit, the current shader is finished and the non-appended operation is left in the child shader program. A sampler register is allocated (corresponding to the output texture of the finished child shader). The sampler register is then used to read the output texture as input to the parent. Although the shader code is generated, the register usage has been done with abstract register objects. These register objects need to be efficiently allocated in order to use no more than the number estimated during code generation.

At 806, registers are allocated. This may be performed as part of pass 2 or separated into a third pass. A scheme is used that keeps a list of free registers. The lifetime of each register is computed from its first definition until its last use. When a value in a temporary register is used for the last time, that register is moved to the front of a free register list. When a new register is needed, the next free register on the list is used. There are a few minor restrictions that might prevent a free register from being used. These include instructions that do not allow the destination register to be the same as any of the received input parameters. A register is not put on the free list if it has been used in a chain of operations that exceeds the limits on dependent texture reads. However, these do not fundamentally change the algorithm. Sampler registers, constant registers and texture coordinate registers are allocated in the order they are defined and are never freed.

After code generation and register allocation, the DAG of shaders can be executed on the GPU and the result is converted to an array in system memory. The shader DAG is evaluated in post order. The evaluation of each node returns a texture that is used as the input to one of the sampler registers which serve as input to the parent shader. The output of the root is converted to an array in system memory.

Example Shader Breaks Notated in an Expression DAG

Figure 9:
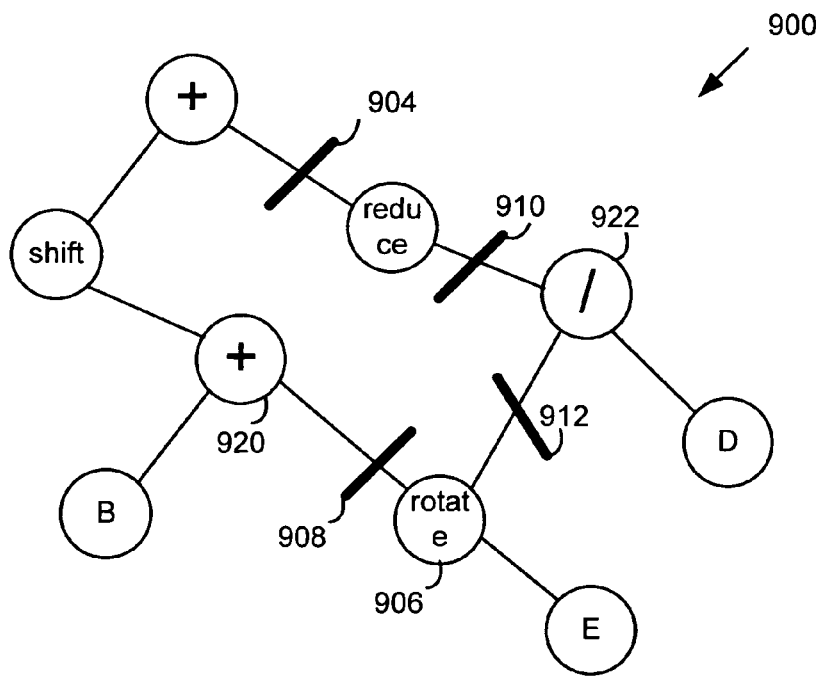
FIG. 9 is a graph of an example expression data acyclic graph including a visual representation of shader breaks.

FIG. 9 is a graph of an example expression data acyclic graph including a visual representation of shader breaks. In this example, the expression DAG 900 includes breaks for various reasons.

A texture in the GPU environment is similar to an array in the CPU environment. The GPU operates on the textures in parallel and that quality is harnessed to provide parallel processing on arrays, when arrays are provided to a graphics processor. A shader program (e.g., pixel shader) receives textures as inputs and returns textures as outputs. However, processing often requires multiple shaders to perform a desired operation. Thus a texture output often serves as input to a next shader program. When the size of the texture output is different from that expected as input to the next shader program, then the shader break is inserted in the eDAG so the texture size can be changed between shader programs. During the construction of the sDAG these "breaks for size change" are inserted after the reduce operation 904.

In another example, the interpreter breaks for expensive common sub-expressions 908, 912. For example, both nodes 920 and 922 have a common expensive (e.g., computation expensive, large texture size, etc.) sub-expression 906, that serve as inputs, so breaks are asserted there in the graph 908, 912. Breaks are also marked for any parameter nodes if the parent operation must access the parameter data in more than one location. This occurs, for example, with reduce 910. Optionally, in an optimized version, texture coordinate operations are combined and moved to take effect at leaves, as will be discussed later.

Example Packaging of Shader Programs

Figure 10:
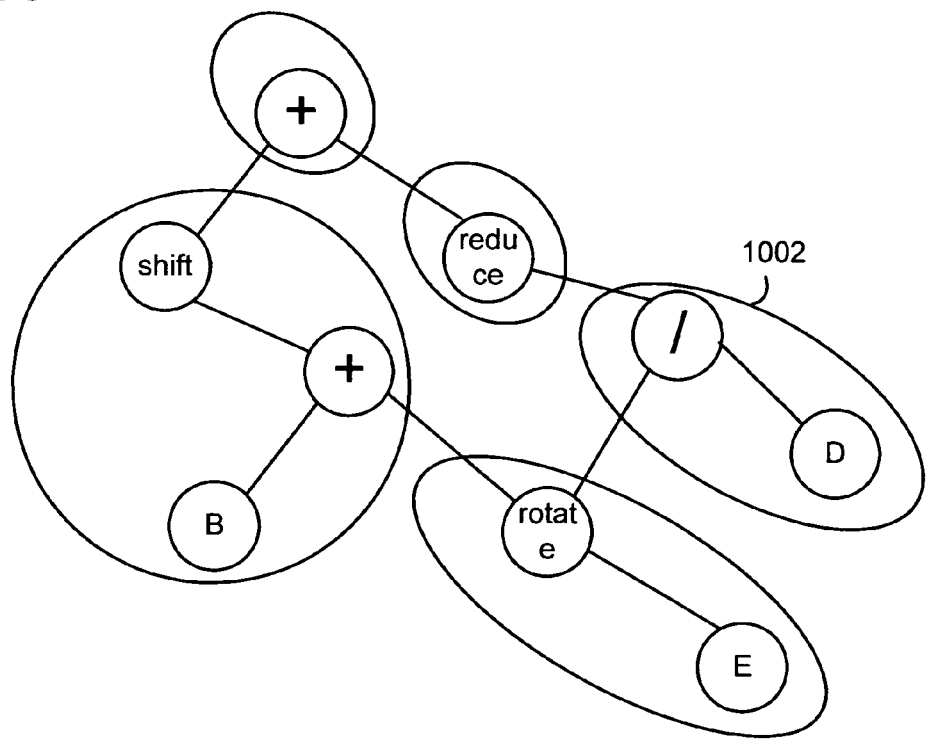
FIG. 10 is a graph of an example shader data acyclic graph showing a representation of shader code in nodes of the graph.

FIG. 10 is a graph of an example shader data acyclic graph showing a representation of shader code in nodes of the graph.

The eDAG nodes, are traversed in a post-order fashion and each nodes delivers the shader code that computes its value along with the register where the value resides. In one such example, the nodes of expression DAG determine shader code that corresponds to instructions required to obtain the value represented by that node. During the post-order traversal, a parent node is responsible for producing a small number of shader nodes, and hence will combine with children where possible. This helps reduce overhead since there is considerable time associated with running a shader program on the GPU, reading texture inputs for a shader program from memory, and writing its texture output into memory. Thus, each child is examined by its parents to see if that child can be combined with the parent, along with any other children already combined with that parent. If the child can be combined, the child shader will be appended with the parent code 1002. The number of instructions that an operation will add to a shader are pre-computed, along with the number of additional registers of each kind that will be required by the operation. If appending the operation would exceed a resource limit, the current shader is finished and the non-appended operation is put in a new shader.

Example Resource Constraints

Although register limits are often specified by the version of a pixel shader language, a GAPI often provides a method call that will return information about resource constraints of a graphical environment. In one such example, a DirectX API provides a data structure (e.g., PS20CAPS) that returns various resource constraints such as those shown in Table C.

TABLE C

D3DPS20CAPS_NOTEXINSTRUCTIONLIMIT
D3DPS20_MAX_NUMTEMPS
D3DPS20_MIN_NUMTEMPS
D3DPS20_MAX_NUMINSTRUCTIONSLOTS
D3DPS20_MIN_NUMINSTRUCTIONSLOTS

In some cases, the number of texture coordinate registers and samplers are fixed based on a pixel shader version. Some environments provide a maximum number of dependent texture reads that should not be exceeded in a pixel shader. In other cases, such as with Pixel Shader 3.0, a pixel shader version requires shader drivers to remove limits on the number of dependent texture reads. Thus, an interpreter monitors resource constraints as pixel shaders are built, and shaders are finished when monitored constraints are triggered.

In one example, a graphics processor reports, through a DirectX capabilities object, which pixel shader version(s) it supports. Such capabilities may include the maximum dimensions of a texture, the maximum number of registers, or the number of (Version 3.0) instruction slots. These limits are checked by the interpreter and used to control when a shader is as large as possible. Again, fewer larger shaders generally provide a better optimization due to the costs associated with executing shader programs, reading input textures from graphics memory, and writing an output text to graphics memory.

Table D provides example limits monitored by the interpreter.

TABLE D

| | Pixel Shader 2.0 | Pixel Shader 3.0 |
|---|---|---|
| Number of instruction slots | 96 | 512 |
| Number of texture reads | 32 | 512 |
| Number of temporary registers | 12 | 32 |
| Number of constant registers | 32 | 224 |
| Number of texture coordinate registers | 8 | 10 |

These restrictions may be used by an interpreter in various ways. If a graphics card does not support an operation, the interpreter disables that functionality. If a card does not support clamping, wrapping or non-square textures, then the interpreter might not run those requests or might simulate them in pixel shader code. If a user asks for an Accelerator array that is larger than the maximum texture size, an exception might be thrown or the array might be managed by the interpreter and allocated across multiple textures. These restrictions are also used to provide fine-grained control of the pixel shaders as they are generated. Based on resource constraints in a given environment, an interpreter may use register limits or instruction limits to determine when a shader is reaching a maximum size, or when it needs to be broken into two (or more) smaller shaders to meet a resource requirement.

Example Recursive Shader Construction

As discussed above (e.g., Pass 2), the construction of shaders may be done recursively. Additionally, the nodes of the graph may be objects that perform the shader construction. In one such example, a node in the expression tree asks its children to return a shader which computes the child's value and the temporary register that contains this value. In one such example, a shader program returns only one output value. This single return value limits how child nodes are combined. For example, since each shader program can typically only output one value (texture), two children of a parent can not give two values to their parent unless they are in separate shader programs. So children can not be combined (e.g., their code can not be appended to each other) in one shader program that is separate from the parent's shader program. However, one child can be combined with the parent since code in the same shader can share information through registers.

A parent node needs information about its children before the parent can determine whether or not the child node (e.g., a child or parent node comprises shader instruction(s) carrying out an operation) can be appended to the parent node. So, a parent may require its children to provide information.

Using this information, a parent may determine that one or more of its children should be in a separate shader program. Then, during evaluation of a shader DAG, the shader program representing that separate child will move its output value to the output register where it will be be written to the output texture for that program. This output texture will then be available to the parent as input. Thus, when the parent requires that child to be pre-evaluated, then the child is said to be "finished".

A parent will require a child to be finished in various examples. This will often be required for operations such as inner product, reduce, and outer product, because these types of operations use values that are not at the default texture coordinate. These operations can be identified by the interpreter, for example, by a simple table lookup. In another example, if the child's output is a different size (e.g., texture dimensions) than the parent's, then child is finished.

Additionally, the interpreter checks each child in turn to see if appending the parent's code to the child will exceed resource limits. In this example, resource limits are registers, and/or instruction count limits. If appending the child to the parent would exceed a register limit, then the parent would finish the child. If it would not exceed the limits, then child is left unfinished. All unfinished children of the parent are combined into the shader of their parent. Each unfinished child's evaluation value is available within the shader program, and the parent's code is appended within the shader program with its unfinished children. For every finished child's shader program output, a sampler register is introduced and a texld instruction is appended to the parent shader to read the finished child shader program's output. This allows the parent's code to access the texture that holds the output of the shader for the child.

To check for resource limits, the interpreter counts and stores the number of registers and/or lines of code in a shader under construction. Optionally, the information is stored in a data structure of each node, and passed to the parent in response to a resource information request, thereby following the recursive nature of a graph of nodes. In such an example, a parent node counts potential child resources and adds the child's resource counts to itself as children are considered as appended code.

Optionally, if it appears that a shader under recursive construction may use too many resources, a register allocator might be invoked to traverse the proposed shader DAG in order to get an accurate count and see if a child may actually fit in with its parent. Often, a full register allocator routine can provide a better register reuse calculation when traversing the proposed graph. It is helpful to know most (or all) of the instructions proposed for a shader before a best case register assignment and count is provided.

Example Register Allocation

While a shader DAG is under construction, it is not necessary to assign the actual registers that will be used during shader program execution. Thus, during shader construction, an interpreter may instead use abstract objects to manage register resources. Thus, prior to execution of the shader program, the shader code (lines of code) may be using abstract register objects.

However, it is desirable to re-use registers where possible. A standard technique can be used to allocate registers for a basic block. In one example, this technique runs through the lines of code backwards keeping track of the last use of a register and the first definition of its value. Then in a forward pass through the code, the allocator keeps a list of free registers. At the first definition of a register, a free register is assigned to be this register. On the last use of a register, the register is added to the free list. This allocation algorithm is run with a slight variation. The allocation scheme does not allow the destination register to be the same as one of the parameters in a sincos, lrp or nrm instruction. Nor does the scheme reuse a register if doing so would pass the limit on dependent texture reads.

Example Shader Breaks in an Expression DAG

As described above (e.g., Passes 1 and 2), an expression DAG is marked (e.g., a textual indication, inserted node, etc.) in places where a child expression evaluation should be forced. The expression DAG then indicates where to force evaluation of a sub-expression. For example, an evaluation may be forced at structurally required points, such as where output sizes change or where there are non-composable texture coordinate operations, or where sampling of the parameters will happen at several places.

There are also places where a sub-expression is forced for efficiency. A shape changing texture coordinate operation might be left in place and evaluated and not be pushed to the leaves if it is going to access each value in the texture (array) many times, for example, in a replicate or expand operation. If the sub-expression is large enough, it is evaluated to save the cost of recomputing each value multiple times. Next, this determination is computed based on comparing the costs of accessing multiple times versus the costs of forcing another shader program in the shader DAG.

Expensive Common Sub-Expressions

The other place where a sub-expression is evaluated for efficiency's sake is when the sub-expression is used many times and it is relatively expensive to compute. Here, the cost to compute the expression separately is Cost(Computing the expression)+Cost(one shader pass overhead). The cost for all uses is therefore Cost(Computing the expression)+Cost(one shader pass overhead)+Cost(accessing the result in memory)*N, where N is the number of uses of the expression. If the expression (program code) is not forced into a separate shader program (e.g., shader break), then the cost of the expression is N*Cost(computing the expression). Thus, a determination is made to compute a separate shader program for an expression that is referenced N times, if (Cost(one shader pass overhead)+Cost(accessing the result in memory)*N)>((N−1) *Cost(computing the expression)). The cost of computing the expression is computed from the cost per memory access and the cost per arithmetic instructions. These numbers are found experimentally, and each depends on the size of the input.

Example Accelerator Code

Table E is an example of source code received as input to an interpreter (e.g., an Accelerator Program Code). It is not the object of this example to discuss the use and/or release of registers, as this is well known in the compiler arts. This is an example showing an annotation in an expression tree indicating shader breaks.

TABLE E

```
AcceleratorFloatStream acfs0 = op.CreateStream(rgfl);
AcceleratorFloatStream acfs1 = op.CreateStream(rgfl22);
AcceleratorFloatStream acfs2 = op.CreateStream(rgfl23);
AcceleratorFloatStream acfs3 = op.CreateStream(rgfl23);
AcceleratorFloatStream acfs4 = op.CreateStream(rgfl23);
AcceleratorFloatStream acfs5 = op.CreateStream(rgfl23);
AcceleratorFloatStream acfs6 = op.CreateStream(rgfl23);
acfs1a = op.Add(acfs1, acfs2);
acfs3a = op.Sub(acfs3, acfs4);
acfs5a = op.Mul(acfs5, acfs6);
acfs1 = op.Add(acfs1, op.Div(acfs2,1f));
acfs3 = op.Sub(acfs3, op.Mul(acfs4,1f));
acfs5 = op.Add(acfs5, op.Div(acfs6,1f));
acfs1 = op.Sub(acfs1a, op.Div(acfs2,1f));
acfs3 = op.Add(acfs3a, op.Mul(acfs4,1f));
acfs5 = op.Add(acfs5a, op.Mul(acfs6,1f));
acfs5 = op.Shift(acfs5, new int[ ]{1, 0});
acfs5 = op.Sub(acfs5, acfs3);
acfs5 = op.Mul(acfs5, acfs1); // code runs out of temp registers
acfs5 = op.Add(acfs5, acfs1a);
acfs5 = op.Add(acfs5, acfs3a);
acfs5 = op.Mul(acfs5, acfs5a);
acfs5 = op.Add(acfs5, acfs2);
acfs5 = op.Add(acfs5, acfs4);
acfs5 = op.Sub(acfs5, acfs6);
acfs5 = op.Add(acfs5, acfs1);
acfs5 = op.Mul(acfs5, acfs3);
acfs5 = op.Add(acfs5, acfs1a);
acfs5 = op.Sub(acfs5, acfs3a);
acfs5 = op.Add(acfs5, acfs5a);
acfs5 = op.Add(acfs5, acfs2);
acfs5 = op.Sub(acfs5, acfs4);
acfs5 = op.Add(acfs5, acfs6);
acfs5 = op.Mul(acfs5, acfs1);
acfs5 = op.Add(acfs5, acfs3);
op.ConvertStreamToArray(acfs5, out rgflOut);
```

Example Expression DAG

Table F is a textual representation of an expression DAG for the input source code of Table E. The numbers in the expression DAG represent nodes identifiers for nodes of the graph. No particular data structure (i.e., tree, graph, table, database, etc.) is required to hold the relations generated by the interpreter in response to the input code of Table E, but an expression tree is used in Table F.

TABLE F

```
Add 56
  Mul 55
    Add 54
      Sub 53
        Add 52
          Add 51
            Sub 50
              Add 49
                Mul 48
                  Add 47
                    Sub 46
                      Add 45
                        Add 44
                          Mul 43
                            Add 42
                              Add 41
                                Mul 40
                                  Sub 39
                                    Section 38
                                      Add 37
                                        Mul 19
                                          SourceData 15
                                          SourceData 16
                                        Mul 36
                                          SourceData 16
                                          SourceConstant 35
                                      Add 34
                                        Sub 18
                                          SourceData 13
                                          SourceData 14
                                        Mul 33
                                          SourceData 14
                                          SourceConstant 32
                                    Sub 31
                                      Add 17
                                        SourceData 11
                                        SourceData 12
                                      Div 30
                                        SourceData 12
                                        SourceConstant 29
                                    Add 17
                                    Sub 18
                                  Mul 19
                                  SourceData 12
                                  SourceData 14
                                SourceData 16
                              Sub 31
                              Add 34
                            Add 17
                            Sub 18
                          Mul 19
                          SourceData 12
                          SourceData 14
                          SourceData 16
                        Sub 31
                        Add 34
```

Example Expression DAG Marked with Breaks

Table G is a textual representation of an expression DAG of Table F with shader break node is added based on running out of temp registers. Note that the expression tree of Table G breaks before node 19. This is because node 19 was used twice, but in one use, it was preceded by a texture coordinate operation (the section). Therefore the value is computed before the section is performed.

TABLE G

```
Add 56
  Mul 55
    Add 54
      Sub 53
        Add 52
```

TABLE G-continued

```
          Add 51
            Sub 50
              Add 49
                Mul 48
                  Add 47
                    Sub 46
                      Add 45
                        Add 44
                          Mul 43
                            Add 42
                              Add 41
                                Mul 40
                                  Sub 39
                                    Section 38
                                      Add 37
                                        ShaderBreak 19
                                        Mul 19
                                          SourceData 15
                                          SourceData 16
                                        Mul 36
                                          SourceData 16
                                          SourceConstant 35
                                      Add 34
                                        Sub 18
                                          SourceData 13
                                          SourceData 14
                                        Mul 33
                                          SourceData 14
                                          SourceConstant 32
                                    Sub 31
                                      Add 17
                                        SourceData 11
                                        SourceData 12
                                      Div 30
                                        SourceData 12
                                        SourceConstant 29
                                    Add 17
                                    Sub 18
                                ShaderBreak 19
                                  SourceData 12
                                  SourceData 14
                                  SourceData 16
                              Sub 31
                              Add 34
                            Add 17
                            Sub 18
                          ShaderBreak 19
                          Mul 19
                          SourceData 12
                          SourceData 14
                          SourceData 16
                        Sub 31
Add 34
```

Example Shader

Table H is an example of shader code that is generated by an interpreter from the example input source code of Table E based on resource constraints of an arbitrary graphics environment. It will be understood by those of ordinary skill in the computing arts that Tables E through H are merely example textual printouts of automated shader construction steps (e.g., input source code, expression tree, expression tree with shader break nodes, and constructed graphics assembly language source code (before compiling to executable binary code (not shown))), and these exemplary printouts do not limit the functional nature of the program code or logic that created them.

TABLE H

```
ps_2_0
dcl_2d s0
```

TABLE H-continued

```
dcl_2d s1
dcl t0.xy
texld r0, t0, s0
texld r1, t0, s1
mul r1, r0, r1
mov oC0, r1
ps_2_0
dcl_2d s0
dcl_2d s1
dcl t0.xy
texld r0, t0, s0
texld r1, t0, s1
add r0, r0, r1
rcp r2, c0.x
mul r2, r1, r2
sub r2, r0, r2
mov oC0, r2
ps_2_0
dcl_2d s0
dcl_2d s1
dcl_2d s2
dcl_2d s3
dcl_2d s4
dcl_2d s5
dcl_2d s6
dcl t0.xy
dcl t1.xy
texld r0, t0, s0
texld r1, t0, s1
mul r1, r1, c0
add r1, r0, r1
texld r0, t1, s2
texld r2, t1, s3
sub r3, r0, r2
mul r4, r2, c0
add r4, r3, r4
sub r4, r1, r4
texld r1, t1, s4
mul r1, r4, r1
texld r5, t1, s5
texld r6, t1, s6
add r4, r5, r6
add r4, r1, r4
sub r1, r0, r2
add r1, r4, r1
texld r7, t1, s0
mul r1, r1, r7
add r1, r1, r6
add r1, r1, r2
texld r8, t1, s1
sub r1, r1, r8
add r4, r5, r6
rcp r3, c0.x
mul r3, r6, r3
sub r3, r4, r3
add r3, r1, r3
sub r1, r0, r2
mul r4, r2, c0
add r4, r1, r4
mul r4, r3, r4
add r3, r5, r6
add r3, r4, r3
sub r4, r0, r2
sub r4, r3, r4
add r7, r4, r7
add r7, r7, r6
sub r7, r7, r2
add r8, r7, r8
add r5, r5, r6
rcp r7, c0.x
mul r7, r6, r7
sub r7, r5, r7
mul r7, r8, r7
sub r0, r0, r2
mul r2, r2, c0
add r2, r0, r2
add r2, r7, r2
mov oC0, r2
```

Exemplary Shader Break Optimizations

As mentioned above, certain complex primitives can not be combined with other operations in the same shader. Certain breaks are required by the inherent design of pixel shader execution. The values in texture coordinate registers are based on the size of the output. If an input to an operation is of different size than the output, it can be a costly or complex computation to adjust the texture coordinate registers for earlier computations. This complexity signals breaking shaders in an expression tree when the input and output data are of different sizes. By breaking, bookkeeping for memory address calculation is not needed. Note that once a shader program is executed, its output (which is the value of a sub-DAG of the expression DAG), can then be treated as input data. In a next sub-DAG, this previous output texture, can be used as an input texture. Any operation referring to this input texture can expect it to be in memory. In this way, operations within a shader program can treat sub-expressions in the same way that they would treat raw data (e.g., an input texture to a shader program).

Some API operations do not combine well into one shader program, for example, if the input and output value shapes are not related by affine transformations that compose. Other operations combine more easily since they only alter via an affine transform the position of the data sampled (read) from a texture. This class of operations is referred to as texture coordinate operations. These texture coordinate operations include shift, rotate, and transpose. Texture coordinate operations also include pad, expand, and replicate, where transformations from output coordinates (locations) to input coordinates (locations) involve affine transformations composed with other transformations to handle boundary conditions for input coordinates. A boundary condition is a case where the input coordinate does not lie within the bounds for the input texture. The other transformations consist of non-linear transformations such as modulus (i.e. modular arithmetic) and clamping input coordinates to upper or lower bounds.

Many texture coordinate operations share the property that they are commutative with respect to simple operations, such as add, subtract, multiply, divide, etc. For example, to rotate the sum of two arrays, a shader program can simply rotate the two arrays and then sum them. However, some operations, such as those that fill in a different default value at a border will not commute.

Texture coordinate operations come in two varieties, those whose output maintains the shape of the input and those that expand or shrink the output relative to the input.

Many operations receive values and perform some computation to provide an output value. In contrast, texture coordinate operations merely change from where in memory to fetch the output value. No "computation" is performed on the values from memory. This is in fact why texture coordinate operations are commutative with arithmetic operations. This observation allows using texture coordinate operations to change the memory address (e.g., via an affine or other transformation) where input values are sampled from an input texture.

In pixel shaders, memory is accessed via texture read instructions (texld). A texture read instruction may optionally have a transformation associated with it that transforms the location of the desired output value to a location in the input texture being read by the instruction. This transformation may be set before pixel shader program execution or, alternately, it may be computed explicitly during pixel shader execution. If the transformation is specified before execution begins, then there are typically restrictions on the transformation. A usual restriction is that the transformation be an affine transformation.

In an expression DAG, by definition, memory (i.e. inputs) are accessed at the leaves. Therefore the texture coordinate information needed for determining where to sample a texture/array input can be located at the leaves. Texture coordinate operations can be removed from the expression DAG after their read transformation information is moved to the leaves.

The above is the reasoning for associating (or locating) the memory access transformation information at the leaves, whenever possible. Thus, interior nodes that represent texture coordinate operations can be removed from the expression graph by simply reading the input texture(s) differently, via transformed reads, such as composed texture reads.

A composed texture read is simply a texture read instruction that uses a transformation computed by composing two or more transformations from texture coordinate operations, where the transformations are from output coordinates to input coordinates.

However, there are a few subtleties. For example, when there are two or more texture coordinate operations affecting how memory of an input texture is sampled, they can't always be combined. When two texture coordinate operations can be composed, linear algebra (e.g., matrix multiplication) is used to combine the two transformation matrices into one combined memory read at each leaf.

A determination must be made whether a series of texture coordinate operations can be combined into a single texture coordinate operation read at the leaf. Suppose there are two or more shifts in a shader program. Since texture coordinates are stored as transformation matrices, it is possible to multiply these matrices together to get the composition of the texture coordinate operations. However, there may be other behavior involved in these operations.

For example, this approach is complicated based on how "empty" values at the border of a texture are handled. A "shift" operation as known by CPU programmers, is the same operation as a "clamp" operation as known by GPU programmers. Similarly, a "rotate" is a CPU operation that is known as a "wrap" in GPU terminology, and a "default" operation in CPU terminology is a "border color" operation on a GPU.

For example, assume an operation starts with the following texture/array A:

$$A = \begin{matrix} 2 & 5 & 6 \\ 7 & 1 & 3 \\ 4 & 5 & 9 \end{matrix}$$

As previously described, a shift operation maintains the "shifted away from border" values while the contents are shifted in the indicated direction.

For example, a shift 'one' right operation (or clamp) of the above texture A provides the following result:

$$\begin{matrix} 2 & 2 & 5 \\ 7 & 7 & 1 \\ 4 & 4 & 5 \end{matrix}$$

Whereas a rotate operation (or wrap) of texture A provides the following:

$$\begin{matrix} 6 & 2 & 5 \\ 3 & 7 & 1 \\ 9 & 4 & 5 \end{matrix}$$

Finally, a default operation (or border color) operation of texture A, with default "0" at the border provides the following result:

$$\begin{matrix} 0 & 2 & 5 \\ 0 & 7 & 1 \\ 0 & 4 & 5 \end{matrix}$$

These example texture coordinate operations with different border effects can not typically be combined. This would be the case, for example, when a rotate is followed by a shift. In that example, an affine transform does not keep track of the border conditions. Specifically, an affine transformation can't account for different treatments of border transformations.

Whereas other transformations combine well, such as, a series of shift transformations in the same direction (e.g., shift left, add, shift left, add) compose well.

Another issue that arises is the impact on performance when moving a transformation to the leaves. For example, given a texture coordinate operation that maintains the size of the input (e.g. shift, rotate, etc), there is no loss of efficiency to transport the fetch to the leaves. If the texture coordinate operation's output is smaller than the input, changing the memory access at the leaves actually decreases the number of memory accesses for the computation. For example, if every other element of the sum of two arrays are desired (e.g., a section operation after an add operation), it saves time to place the section at the leaves (on the input arrays) and do half the number of memory accesses and half the number of additions.

The opposite is also true. If the texture coordinate operation expands the size of the input, changing the memory access to the leaves will actually increase the amount of work done. For example, to tile a larger array with the sum of two arrays, pushing the tiling to the leaves would require accessing each array element many times to produce the tiling and then redundantly add the tiled arrays. In this case, better performance might be achieved by keeping the expand operations in place. However since expansion operations alter the size of the input, they also require a shader break if left in place. Thus there is a tradeoff between the time required to load another shader by keeping the expansion operation in place versus, pushing an expansion operation to the leaf and accessing memory more times. This tradeoff can be evaluated based on comparing the overhead of a shader pass, the size of the data and the complexity of the value being computed.

This trade-off can be quantified given the following ("trade-off equation"): Consider the function, $f_{tc}(g(A, B))$, where A and B are arrays with n data elements, g is an arithmetic operation and $f_{tc}$ is a texture coordinate operation that results in an array with k*n elements where k>1. Let $C_{mem}(m)$ be the cost of doing m memory accesses. The cost of computing $f_{tc}$ (g (A, B)) is:

$$2*C_{mem}(n)+T_g(n)+C_{mem}(kn)+\text{Overhead}$$

The first term ($2*C_{mem}(n)$) is the time to read both A and B, the second term ($T_g$ (n)) is the time to compute g, the third term ($C_{mem}(kn)$) is the time to compute the $f_{tc}$, and the last term (Overhead) is the cost of the pass overhead.

Whereas, to compute g ($f_{tc}(A)$, $f_{tc}(B)$), which is pushing the texture coordinate operation to the leaves, would cost:

$$2*C_{mem}(kn)+T_g(kn)$$

Here the first term ($2*C_{mem}(kn)$) is the cost of computing $f_{tc}$ on A and B, and the second term ($T_g(kn)$) is the cost of computing g on the transformed input.

By comparing these equations, while assuming that memory access cost is linear in the number of memory accesses, a performance improvement is obtained by moving the operation to the leaves when the overhead of a pass is greater than $(k-2)*C_{mem}(n)+(k-1)*T_g(n)$.

Example Texture Coordinate Operation Compositions

If texture coordinate operations can be composed, it is often desirable to combine them (e.g., matrix multiplication) into one texture coordinate operation and push it to the leaves. This results in fewer shaders and hence fewer memory reads. Some texture coordinate operations can be composed, for example a left shift of 3 places of a left shift of 2 places is a left shift of 5 places. However a clamp of the edge can not be composed with a rotate. Instead, the interpreter inserts a break (e.g., Pass 1) between the two non-composing operations in the expression tree. The break signals the interpreter (e.g., Pass 2) to separate the child (below the break annotation) into another shader program in the output shader DAG.

Below Table I indicates which texture coordinate operations compose with other texture coordinate operations.

inserting shader breaks. By not inserting shader breaks in the expression tree, an interpreter need not create additional shader programs in the shader DAG.

Example Shader Construction Method

A method is described for using Table I to identify which texture coordinate operations to combine. The combined transformation is moved to the memory reads, such as at a leaf node.

First, when evaluating an expression DAG, a preliminary preorder traversal determines where divisions between shaders must occur. These breaks occur before shape changing operations, before operations such as reduce and inner product that perform many specialized memory accesses. Since certain indicated texture coordinate operations (e.g., Table I) can not be combined, breaks are inserted along paths with multiple of these texture coordinate operations that can not be combined. Breaks are also placed before texture coordinate operations that greatly expand the size of their input.

After this initial traversal, the expression DAG is walked and a (composed) memory transformation is provided for each texture coordinate operation. These memory transformations are then associated with the leaf nodes where the memory access occurs. Since each leaf can be accessed many times, it can have many associated transformations. The correct transformation must be applied for each access. To obtain the correct transformation at a leaf, the access is associated with the unique path between the leaf and the texture coordinate operation that defined the transformation. This association can be maintained in a hash-table or other data structure that is keyed with the leaf id and path nodes' ids. If all traversals of the expression occur in the same order, then the transformations can be stored in queues at each leaf node. The DAG can also be made into a tree and the information stored in the now unique leaf. The shader generation traversal can now ignore the texture coordinate operations (since the com-

TABLE I

Composition of Texture Coordinate Operations

| Operations | Clamp | Border Color | Wrap | Tile | Section | Stretch |
|---|---|---|---|---|---|---|
| Clamp | Break required- each clamp fills in with a different value | If same direction, becomes a border color. OW, Break. | Break | Break | Break if the area does not include the edge | Compose |
| Border Color | Compose to clamp if the same direction. OW Break | If same direction and same default, OK, otherwise Break. | Break | Break | Break | Compose |
| Wrap | Break | Break | Composes | Break | Break | Compose |
| Tile | Compose | Compose | Compose | Compose | Compose | Compose |
| Section | Break | Break | Break | Compose | Compose | Compose |
| Stretch | Compose | Compose | Compose | Compose | Compose | Compose |

For example, the information in Table I can be used by an interpreter (e.g., Pass 1) to determine which texture coordinate operations compose. Using Table I, the interpreter composes the indicated texture coordinate operations instead of posed read access transformation occurs at the leaf) and for each leaf node simply look up the transformation to apply to the texture coordinate register in the associated texture load instruction.

As shaders are generated in the shader DAG, they are divided when they become too large (e.g., construction count, register use, etc.). This can still be done after the described texture coordinate handling.

Example Monitoring of Resource Constraints

One possibility of shader construction is to generate one large shader program that provides the desired evaluation for the input expression without regard to any resource constraints and then divide it up according to hardware constraints. Another possibility is monitoring resource constraints as the shader DAG is built up recursively as described above. The interpreter generates GPU instructions and breaks the shader code as monitored resource constraints are reached. This allows examining input to and outputs from shaders, and determining whether or not program code can be combined with a present shader as the instructions are generated.

Example

Moving Composed Texture Coordinate Operations

Earlier a method was described for annotating an expression DAG with shader breaks (e.g., FIG. 9) and for constructing a shader DAG generated considering various shader break annotations (e.g., FIG. 10). Where possible, it is preferable to eliminate (or not introduce) shader breaks since the interpreter uses this annotation to finish a shader (e.g., create another program). Table I discussed composable texture coordinate operations. When texture coordinate operations can be combined and/or pushed to a shader leaf, one or more shader breaks will be unnecessary. For example, this technique can be used to suppress the generation of one or more of the shader breaks discussed in Pass 1 above.

Figure 11:
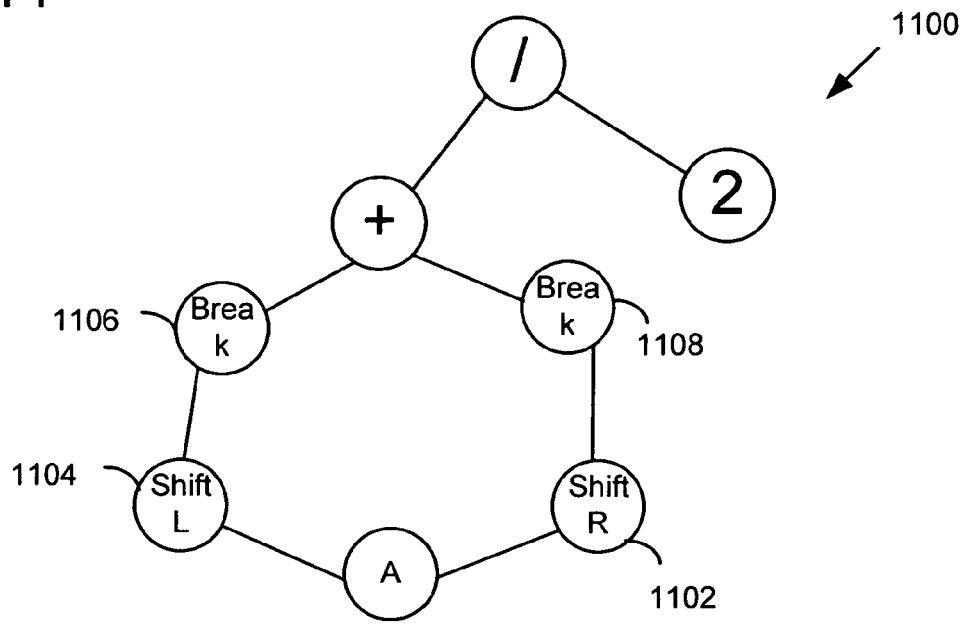
FIG. 11 is a graph of an example expression data acyclic graph that includes a visual representation of a shader break.

FIG. 11 is a graph of an example expression data acyclic graph 1100 includes a visual representation of a shader break. The graph 1100 represents a shift left of texture A, added to a shift right of texture A, and then dividing the sum by a constant 2. As previously discussed, the interpreter could insert shader break nodes 1106, 1108 in the expression DAG to account for memory transformations caused by texture coordinate operations 1102, 1104. Thus, this simple expression DAG would otherwise result in a shader DAG of three shader programs. This aspect of the automated shader construction will be further optimized since this expression DAG can be coded into the single following 4 instruction shader:

| texld | r0 | t0 | s0 |
| texld | r1 | t1 | s0 |
| add | r1 | r0 | r1 |
| div | r1 | r1 | c0 |

Note, that in the above shader code, in the first texture load instruction (texld), a texture register (t0) signals how to read from the raw data pointed to by the input texture (s0). Thus, the texture register points to a transformation matrix that is used to sample the input texture in a certain way (e.g., defined by an affine transformation).

A shift operation is changing where it is reading, it is not changing anything in the texture or changing the size of the input texture. That is why it is called a texture coordinate operation. Whereas the plus and divide are "real" operations, or computational in nature.

If the break is inserted creating another shader program, the shifted texture is copied into a new memory location where it can be read and added without transformation, so it would be placed where the parent is expecting to read it. In a sense, when possible, these texture coordinate operations preferably do not belong in a tree of operations since they are really a transformed memory access.

Figure 12:
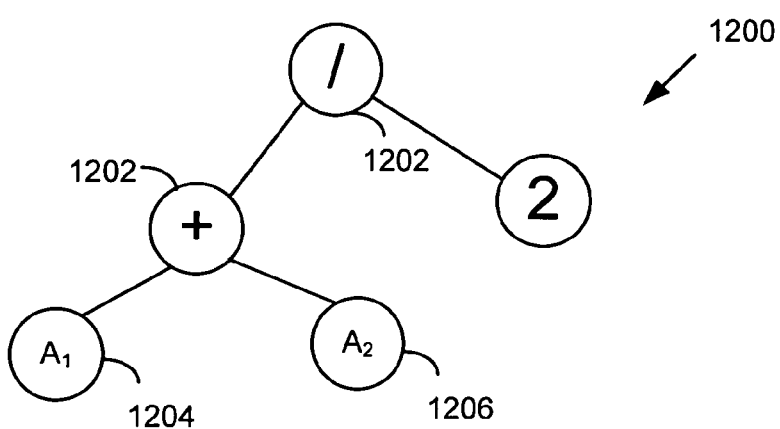
FIG. 12 is a graph of an example expression data acyclic graph with a texture coordinate operation pushed to a leaf.

FIG. 12 is a graph of an example expression data acyclic graph with a texture coordinate operation pushed to a leaf. A shown in FIG. 12, when possible, the graph has operation nodes 1202 and nodes that access memory 1204, 1206. The nodes that access memory 1204, 1206 have information added that describes how the memory (e.g., texture) is read.

So the texture read nodes 1202, 1204, read the texture in a shift one right and a shift one left transformation as directed by the read annotations, without breaking for separate shaders. Effectively, this moves the texture coordinate operations from the expression tree down to the leaves at the memory read.

Additionally, if a sub-expression contains a path through a tree that includes a series of texture coordinate operations (e.g., shift node, add node, shift node, add node, etc.), and if those texture coordinate operations can be composed (e.g., as indicated in Table I), then the composed texture coordinate operation can be pushed to the leaf. Table I indicates which texture coordinate operations can be composed.

In an example texture load (read) operation (e.g., texld r0, t0, s0), the second input parameter (t0) indicates "how" to transform the read of the input sample texture (s0). In one example, this indication of how to read the input texture is provided as an affine transformation.

An affine transformation, can be represented, in the two dimensional case, as $Ax+By+C$, where (x,y) is an element location in a texture, A is a transform coefficient on the x coordinate (column major), B is a transform coefficient on the y coordinate and C is a constant indicating shift left (−) or right (+) C spaces in the x direction. Thus a shift left transform for the x coordinate is represented as (A=1, B=0, C=−1).

For example, the affine transform represents where it will acquire data for the output location. The affine transform is relative to the output location, so it obtains information from the transform location and places it at the output location. For example, the following matrix determines a two dimensional left shift transformation, $$\begin{matrix} 1 & 0 & -1 \\ 0 & 1 & 0 \end{matrix}$$

This texture coordinate operation signals sampling the texture one shift to the left. Thus to compose two shift one left operations, the transformation matrices are multiplied to create a composed transformation or texture coordinate operation. Thus, texture coordinate operations can be expressed by the transformation matrix representing its behavior. A texture coordinate operation is specified by a transformation matrix, and two transformation matrices are combined by multiplying them together. Thus when they can be combined, the method multiplies their transformation matrices and pushes the transformed read to the leaf where the read is taking place.

Exemplary Memory Read Data Structures

Previously, a memory read was notated as a node at the leaf. However, this information can be stored or implemented in other ways. For example, another method saves a texture object A as a read object. The read object then notates that its first read is transformed in one way, a second read is transformed in another way, and etc. This information may also be stored in a list, a hash table, or a queue. The described technology is not limited in any such way.

Example Expansion and Contraction Operations

There are certain cases where a texture coordinate operation changes the size of the output, as compared to an input texture. In one example, an expand operation performs as follows:
Before:
1 2 3 4
After:
1 2 3 4 1 2 3 4

Assume further that an expression DAG expands the output of a sum of two different textures. In such an example, the expand can be pushed to the leaves (e.g., a read of the two input textures) where it will expand the two input textures before the addition. However, if the expand is pushed to the leaves, then it would require reading textures that are twice the size, and then adding twice as many elements since each expanded texture is twice the size. It would require reading 8 times and adding eight times instead of 4. Whereas, if the expand is delayed, it will read the original size, add the original size, and then expand only once.
An example section operation will have the opposite effect:
Before:
1 2 3 4
After:
2 4

Assume further that an expression DAG performs a section operation on the output of a sum of two different textures. This time, by pushing a section to the leaves, the section operation reduces the size of the textures, and fewer sums are required since the smaller textures are being summed. The decision of whether or not to compose and/or push texture coordinate operations to the leaves can be made programmatically if desired, using, for example, the above "trade-off equation".

Example Composing and/or Pushing to a Leaf

An interpreter executes on a central processing unit and creates shader programs. The interpreter receives a request from the application program in the form of a parallel processing request and creates an expression graph responsive to the parallel processing request. When the expression graph has two or more composible texture coordinate operations along a shader graph path, the interpreter generates shader programs from the expression graph by composing the two or more texture coordinate operations, where possible, to create a composed texture read. It is typically more efficient to compose when possible, and thus, is regularly done. However, it is sometimes does not increase efficiency to push a composed texture read operation to a leaf, if it increases costs too much. Optionally, the interpreter moves the composed texture coordinate operations to the leaves of the expression tree, for example to eliminate extra shaders. For example, a composed texture coordinate operation is moved to a leaf to increase efficiency. By composing texture coordinate operations and moving their composed operation to a memory read at a leaf, the number of nodes in the graph is reduced. The interpreter then invokes the created shader programs on the graphics processor to obtain a parallel processing output, and returns the output to the application program as a response to the received request. As will be immediately apparent to those of ordinary skill in the art, the various functional features described herein are not limited to interpreters.

Exemplary Texture Coordinate Operation

In one example, a texture coordinate operation is defined as a parallel operation where each output value in the output data-parallel array(s) is an input value from the input data-parallel array(s), where the location of the input value is computed as a transformation of the location of the output value. In one example, the transformation is an affine transformation. In another example, the transformation is an affine transformation, followed by another transformation to handle boundary conditions produced by the affine transformation. A boundary condition is a case where a transformed location is not within the bounds of the associated input texture.

Exemplary Composed Texture Read

As discussed earlier, a composed texture read is simply a texture read instruction that uses a transformation computed by composing two or more transformations from texture coordinate operations.

Figure 13:
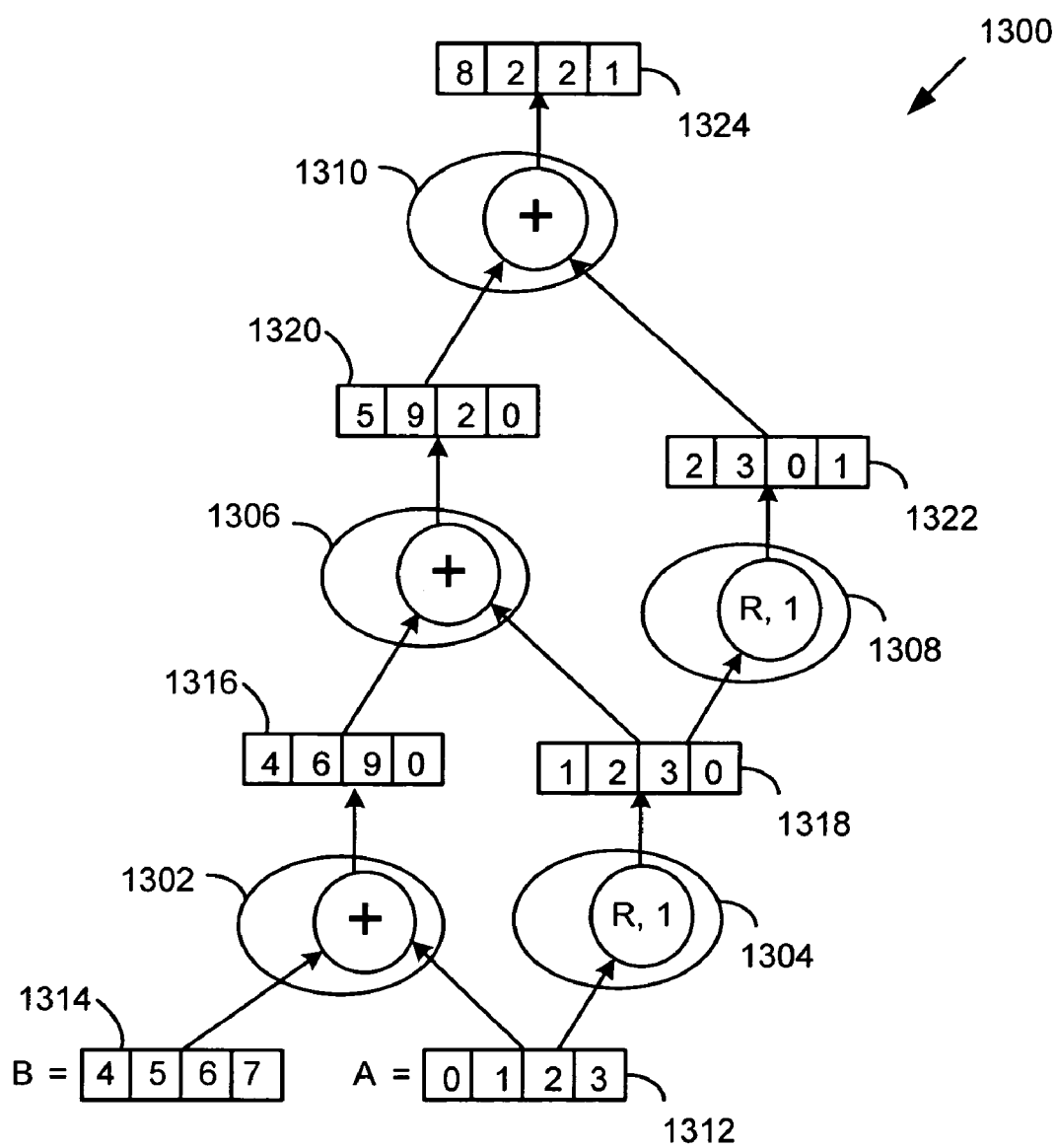
FIG. 13 is a graph of an example expression acyclic graph including a visual representation of input textures and output textures.

FIG. 13 is a graph of an example expression acyclic graph including a visual representation of input textures and output textures. In this example, an eDAG 1300 comprises several expression nodes 1302-1310. One such expression node 1302, at least initially, has two input textures A (1312) and B (1314), and one output texture 1316. Additionally, the texture A is then rotated once 1304, and the rotated output 1318 is summed 1306 with the output of the previous sum 1316, to create a new sum 1320. The rotated output texture 1318 (which is no longer texture A), is then rotated again 1308, and the second rotation 1322, is summed 1310 with the previous output texture 1320, to create an eDAG solution 1324.

For discussion purposes, assume that the nodes 1302-1310 are finished as shader programs (graphics programming instructions not shown in this example). Assumer further that the programs created are invoked on the graphics processor by the interpreter to obtain the intermediate shader program outputs 1316, 1318, 1320, 1322, and the eventual solution 1324. There would be five shader program loaded into graphics memory with associated input textures, and five output textures.

For example, the interpreter loads the first sum shader program 1302 into graphics memory with its two input textures 1312 and 1314, and then invokes the graphics processor to execute the loaded program 1302. Upon completion of graphics processor execution, the interpreter receives the output texture 1316 from the graphics memory. Next, the interpreter loads the rotate shader 1304 into graphics memory and upon program completion, the output texture 1318 would be received by the interpreter. The interpreter then loads a sum shader program 1306 into the graphics memory with its input textures 1316, 1318, and upon completion of the program, the interpreter would receive the output texture 1320. Next, the rotate shader program 1308, is loaded into graphics memory with an input texture 1318, and the output received 1322 by the interpreter. The interpreter then loads the final program 1310 with associated inputs 1320, 1322, and obtains the expression result 1324. Loading programs and textures into memory is time consuming.

Additionally, each program output 1316-1322 is saved by the interpreter if necessary later as an input texture 1316-

1322. Specifically, notice that texture outputs 1318 and 1322 are saved so these rotated outputs are available as inputs to subsequent shader programs as required by the eDAG logic. The shader programs that carry out the rotate operations 1304, 1308, comprise texture coordinate operations. As such, these texture coordinate operations provide an affine transformation in the texture register of a load instruction. However, notice that the affine transformation transforms the load or read based on the previous output conditions and not relative to the original input texture. This observation provides the basis for additional logic for optimization.

Figure 14:
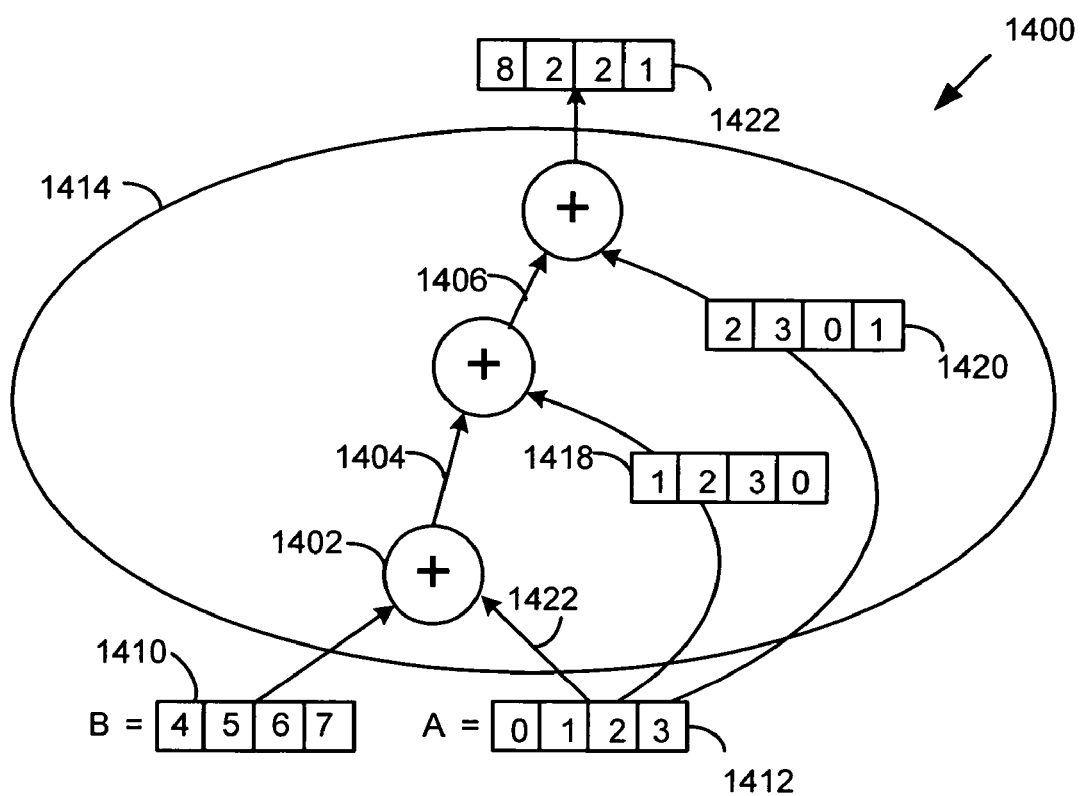
FIG. 14 is a graph of an example expression acyclic graph including a visual representation of input textures and output textures and comprising a composed texture read.

FIG. 14 is a graph of an example expression DAG including a visual representation of input textures and output textures and comprising a composed texture read. Specifically, by composing texture coordinate operations 1308, 1304 of FIG. 13, and providing texture load (read) instructions with a composed affine transformation in the texture register of the load (read) instructions, a input texture is "read" several different ways in a shader program 1422, 1418, 1420, thereby potentially eliminating several shader programs. In this example, a shader program 1414 sums two input registers 1410 and 1412. The output of the sum 1404 is summed with a texture 1418 obtained from a same input texture 1412, but with an affine transform in a texture load (read) instruction that obtains the data rotated one element left. Next, the output of the second sum 1406, is summed with a texture obtained from the same input texture 1412, but with a composed texture read 1420 of the same input texture. Thus, a node of the expression graph contains an annotation to compose the affine transformations 1304, 1308, to create a composed texture read operation 1420 of an input texture 1412. Using this method, an input texture is read differently by composing texture coordinate operations. This allows for the freeing up of the resources required to save intermediate texture states 1318, 1322.

Exemplary Programming of Graphical Resources

An interpreter builds an expression representing a programmer's requested parallel processing requests, such as MDPAs and their associated inputs and operations. Once the interpreter receives a request for a result, the expression is evaluated by the interpreter and returned.

In one such example, the interpreter is logic embedded in a library component providing MDPA data types and associated operations. In such an example, the interpreter evaluates the expression by making one or more calls on a graphics interface or language such as DirectX®, OpenGL®, Cg®, or HLSL® (i.e., a graphics API (GAPI)).

Because graphics processors have limited resources (e.g., memory, registers, etc.) the interpreter determines and evaluates the DAG without exceeding those resources.

Figure 15:
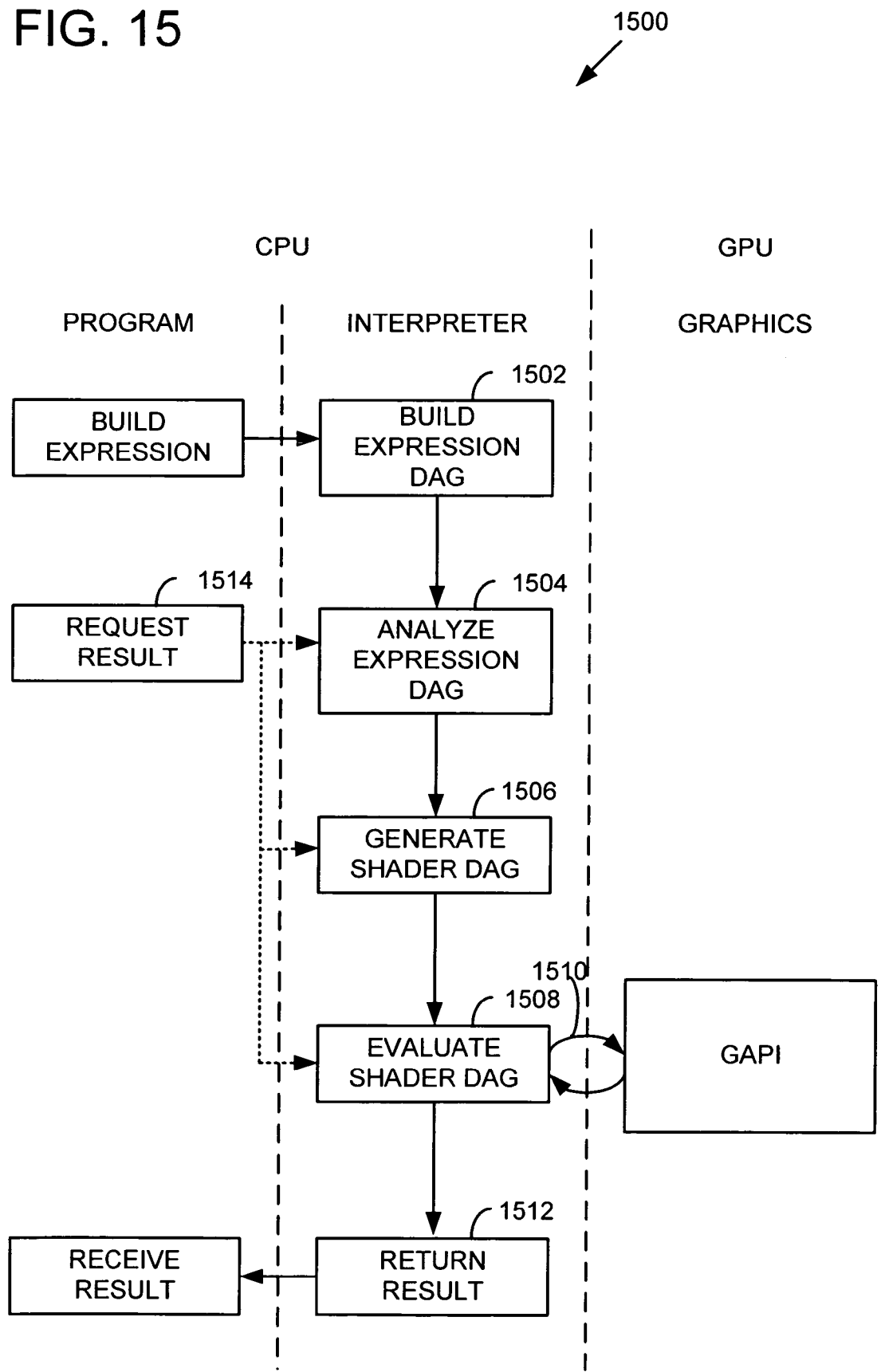
FIG. 15 is a flow diagram of an exemplary method of providing parallel processing to a general purpose high-level programming language.

FIG. 15 is a flow diagram 1500 of an exemplary method of providing parallel processing to a general purpose high-level programming language.

At 1502, the interpreter builds an expression DAG 1502 representing requested parallel processing. For example, referring to FIG. 5, the interpreter receives a request to assign standard language arrays to MDPAs provided via a component library 506. The interpreter assigns the standard arrays to the provided MDPA data types and returns pointers to the application. As shown in FIG. 5, the application programmer can then use pointer references to define relations 510, 514 on the MDPAs. While the application programmer contemplates these references as relations, the interpreter builds a DAG expression 512, 516. These relations represent the parallel processing operations a programmer desires to be evaluated on the graphics processing unit.

Although not required, as the interpreter builds the expression DAG according to the requested relations, the interpreter can create a shader DAG. Additionally, and optionally, the interpreter may optimize the created shader DAG. In one such example, the interpreter begins creating a DAG of shaders and optimizing that DAG of shaders before a relation result is requested 1514 in the standard language 518. Of course, the request 1514 may come at anytime 1502, 1504, 1506, 1508.

At 1504, the interpreter receives a request from the application programming code to evaluate the expression DAG, and the interpreter builds a DAG of shaders. There are two DAGS involved in the evaluation of each expression. There is an expression DAG which directly represents what the user typed. This DAG is converted, at evaluation time, to a shader DAG. The shader DAG is optimized to reduce evaluation overhead.

Although this feature is optional, and its use may vary, it is interesting to note a distinction between a node in an expression DAG and a node in a shader DAG. In an expression DAG, a node is simply a user defined operation. In a shader DAG, a node represents a shader program. In one example, each node in the shader DAG, is just-in-time (JIT) compiled into shader assembly language. In one such example, an efficient optimization of the shader DAG is built before evaluation. At 1504, the interpreter optimizes the shader DAG, by optimizing the number of shaders used to evaluate the expression. In general, the fewer shaders the better, because running a shader has inherent overhead. This may indicate that a larger shader would often be more efficient. However, although graphics memory has been increasing, there are limits to the number of instructions for shaders. Shaders are typically allowed only a small number of inputs. Some expression nodes can not be combined into one shader, for example, the shift operator makes it difficult to keep track of the change in location of the input data for child operations or similarly for operations that change the size of their input. Sometimes an expression node must be turned into several shader nodes. For example, an inner product operation is often provided via several shader nodes. Typical reasons for providing several shader nodes for an expression node include the size of the shader or a need for intermediate results.

Additionally, by delaying evaluation until a result is requested in the form of a standard language array, time is available for optimization. For example, by delaying compilation of shader code, a shader DAG is optimized for efficiency. The delay provides the opportunity for optimization of the shader DAG, which often leads to fewer shaders being compiled to evaluate the expression. For example, delayed just-in-time compiling of the shader code provides time to optimize the shader code.

At 1508, the interpreter instructs the GPU via the GAPI to evaluate the shader DAGs. The interpreter makes one or more calls on the GAPI instructing it to run shaders with inputs comprising the shader DAGs. In one example, the interpreter, traverses the optimized shader DAG and invokes the graphical resources to evaluate the DAG. For example, the interpreter loads a shader and DAG inputs (e.g., one or more MDPAs, constants, operator, etc.) into graphics memory and instructs the GPU to execute the shader DAG. A shader includes code that runs on the GPU. In one such example, these shader DAGs are built and run by the interpreter via calls on the GAPI.

The interpreter calls the GAPI with the required inputs such as textures (e.g., MDPA), constants register values, etc., and mapped or compiled shaders. A series of calls 1510 are made reflecting the traversal of the shader DAG, and once the root of the expression is reached, the interpreter coerces the MDPA back into a standard array and returns 1512 the result.

Example Computing Environment

Figure 16:
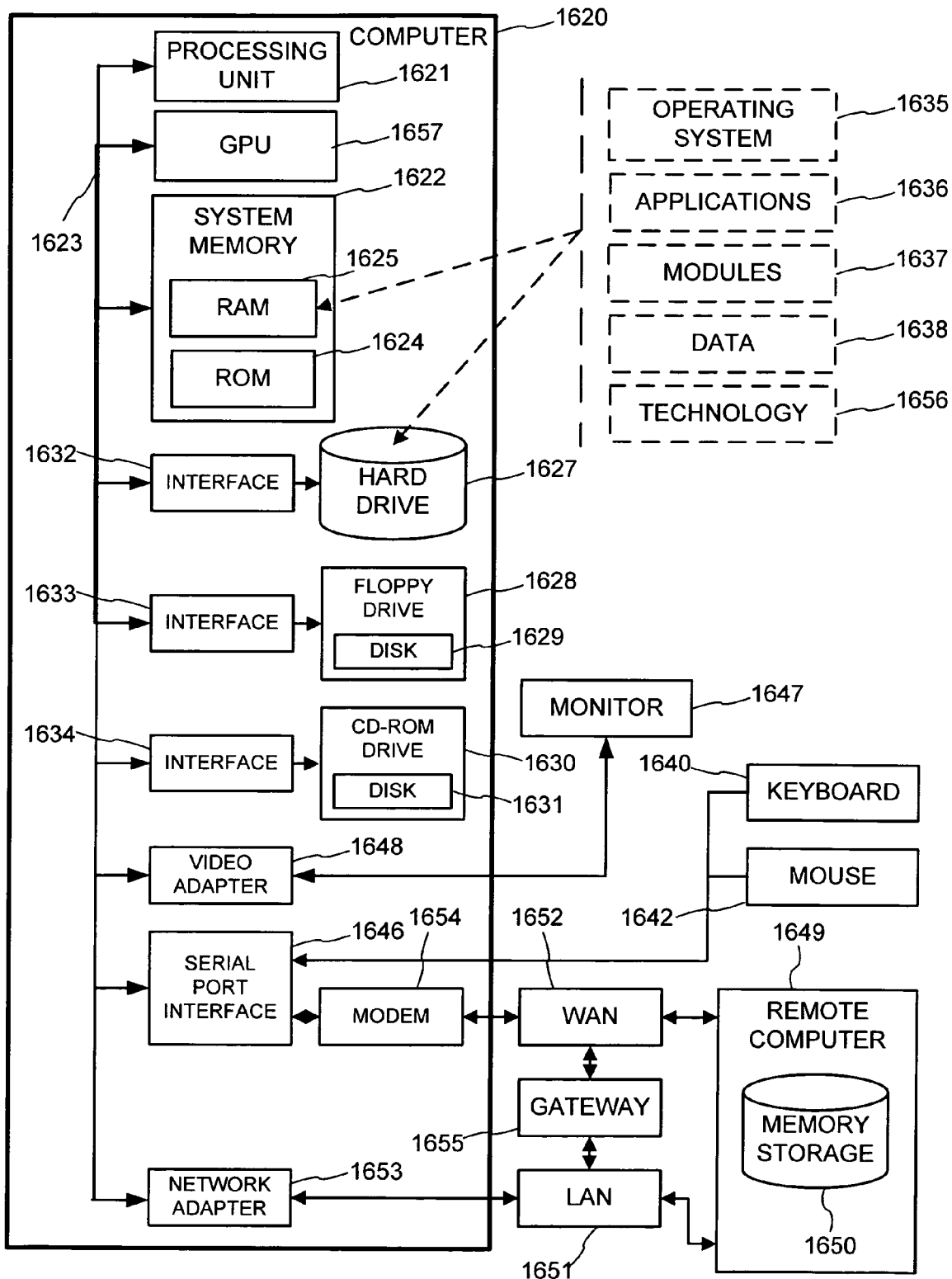
FIG. 16 is a block diagram of a distributed computer system implementing the described technologies.

FIG. 16 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 16, one exemplary computing environment 1600 includes at least one central processing unit (CPU) 1621, and a graphics processing unit (GPU) 1657. The GPU may be integrated with the CPU on a single board or may be interfaced separately as illustrated in FIG. 16. In either case, a CPU or GPU may have additional local memory, not shown. An example system includes a system memory 1622, and a system bus 1623 that couples various system components including the system memory to the processing unit 1621. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1621.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1624 and random access memory (RAM) 1625. A basic input/output system (BIOS), containing the basic routines that help to transfer information between elements within the computer 1620, such as during start-up, is stored in ROM 1624.

The computer 1620 further includes a hard disk drive 1627, a magnetic disk drive 1628, e.g., to read from or write to a removable disk 1629, and an optical disk drive 1630, e.g., for reading a CD-ROM disk 1631 or to read from or write to other optical media. The hard disk drive 1627, magnetic disk drive 1628, and optical disk drive 1630 are connected to the system bus 1623 by a hard disk drive interface 1632, a magnetic disk drive interface 1633, and an optical drive interface 1634, respectively. The drives and their associated computer-readable media provide nonvolatile storage of data, data structures, computer-executable instructions, etc. for the computer 1620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the example operating environment.

A number of program modules may be stored in the drives and RAM 1625, including an operating system 1635, one or more application programs 1636, other program modules 1637, and program data 1638; in addition to an implementation of the described methods and systems of providing graphics resources through optimizing shader construction 1656.

A user may enter commands and information into the computer 1620 through a keyboard 1640 and pointing device, such as a mouse 1642. These and other input devices are often connected to the processing unit 1621 through a serial port interface 1646 that is coupled to the system bus, but may be connected by other interfaces, such as a parallel port, game port or a universal serial bus (USB). A monitor 1647 or other type of display device is also connected to the system bus 1623 via an interface, such as a video adapter 1648. In addition to the monitor, computers typically include other peripheral output devices (not shown), such as speakers and printers.

The computer 1620 operates in a networked environment using logical connections to one or more remote computers, such as a remote computer 1649. The remote computer 1649 may be a server, a router, a peer device or other common network node, and typically includes many or all of the elements described relative to the computer 1620, although only a memory storage device 1650 has been illustrated. The logical connections depicted include a local area network (LAN) 1651 and a wide area network (WAN) 1652. Such networking environments are commonplace in offices, enterprise-wide computer networks, intranets and the Internet.

When used in a LAN networking environment, the computer 1620 is connected to the local network 1651 through a network interface or adapter 1653. When used in a WAN networking environment, the computer 1620 typically includes a modem 1654 or other means for establishing communications (e.g., via the LAN 1651 and a gateway or proxy server 1655) over the wide area network 1652, such as the Internet. The modem 1654, which may be internal or external, is connected to the system bus 1623 via the serial port interface 1646. In a networked environment, program modules depicted relative to the computer 1620, or portions thereof, may be stored in the remote memory storage device. It will be appreciated that the network connections shown are example and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A method comprising:
    providing a parallel programming interface comprising multidimensional data types and a set of parallel operations;
    receiving at least one first parallel processing request at the parallel programming interface, the at least one first parallel processing request comprising at least one evaluation request of one or more parallel operations on one or more input arrays;
    building an expression graph in response to receiving the at least one first parallel processing request, the expression graph comprising nodes representing parallel processing operations; and
    evaluating the one or more parallel operations in response to determining that a second parallel processing request received at the parallel programming interface subsequent to receiving the at least one first parallel processing request at the parallel programming interface requires evaluation of at least one of the one or more parallel operations, the determining occurring in response to receiving the second parallel processing request at the parallel programming interface, the evaluating comprising:
        creating one or more shader programs formed according to resource constraints of a graphics environment; the creating comprising:
            determining that an output texture from a child node comprises an inconsistent size constraint with an input texture of a parent node of the child node; and
            breaking the child node into a separate shader program responsive to determining the inconsistent size constraint;
        receiving an output responsive to invoking the one or more shader programs on a graphics processor; and
        providing the output at the parallel programming interface;
    wherein the method is implemented by a computer; and
    wherein the at least one first parallel processing request and the second parallel processing request are received from an application program executing on the computer.

2. The method of claim 1 wherein the resource constraints of the graphics environment comprise a constraint on the number of uses of a register.

3. The method of claim 1 wherein the resource constraints of the graphics environment comprise a constraint on the number of instructions in a shader program.

4. The method of claim 1 wherein the resource constraints of the graphics environment comprise a constraint on the number of texture reads in a shader program.

5. The method of claim 1 wherein the resource constraints of the graphics environment comprise a constraint on the number of temporary registers in a shader program.

6. The method of claim 1 wherein the resource constraints of the graphics environment comprise a constraint on the number of texture coordinate registers in a shader program.

7. The method of claim 1 wherein the resource constraints of the graphics environment comprise a constraint on the dimensions of a texture.

8. The method of claim 1, wherein creation of at least one of the one or more shader programs begins prior to determining that the second parallel processing request received at the parallel programming interface subsequent to receiving the at least one first parallel processing request at the parallel programming interfaces requires evaluation of at least one of the one or more parallel operations.

9. A method comprising:
    providing a parallel programming interface comprising multidimensional data types and a set of parallel operations;
    receiving at least one first parallel processing request at the parallel programming interface, the at least one first parallel processing request comprising at least one evaluation request of one or more parallel operations on one or more input arrays;
    building an expression graph in response to receiving the at least one first parallel processing request, the expression graph comprising nodes representing parallel processing operations; and
    evaluating the one or more parallel operations in response to determining that a second parallel processing request received at the parallel programming interface subsequent to receiving the at least one first parallel processing request at the parallel programming interface requires evaluation of at least one of the one or more parallel operations, the determining occurring in response to receiving the second parallel processing request at the parallel programming interface, the evaluating comprising:
        creating one or more shader programs formed according to resource constraints of a graphics environment; the creating comprising responsive to determining that two nodes in the expression graph have input paths to a node comprising an expensive common sub-expression, inserting a shader break annotation in the input paths;
        receiving an output responsive to invoking the one or more shader programs on a graphics processor; and
        providing the output at the parallel programming interface;
    wherein the method is implemented by a computer; and
    wherein the at least one first parallel processing request and the second parallel processing request are received from an application program executing on the computer.

10. A method comprising:
    providing a parallel programming interface comprising multidimensional data types and a set of parallel operations;
    receiving at least one first parallel processing request at the parallel programming interface, the at least one first parallel processing request comprising at least one evaluation request of one or more parallel operations on one or more input arrays;
    building an expression graph in response to receiving the at least one first parallel processing request, the expression graph comprising nodes representing parallel processing operations; and
    evaluating the one or more parallel operations in response to determining that a second parallel processing request received at the parallel programming interface subsequent to receiving the at least one first parallel processing request at the parallel programming interface requires evaluation of at least one of the one or more parallel operations, the determining occurring in response to receiving the second parallel processing request at the parallel programming interface, the evaluating comprising:
creating one or more shader programs formed according to resource constraints of a graphics environment; the creating comprising at least one of:
responsive to determining that appending shader code of a child node to a parent node of the child node will exceed a resource constraint of the graphics environment, inserting a first shader break annotation in the expression graph; and
responsive to determining that a path of nodes of parallel processing operations through the expression graph comprises multiple texture coordinate operations, inserting a second shader break annotation in the expression graph;
receiving an output responsive to invoking the one or more shader programs on a graphics processor; and
providing the output at the parallel programming interface;
wherein the method is implemented by a computer; and
wherein the at least one first parallel processing request and the second parallel processing request are received from an application program executing on the computer.

11. The method of claim 10 wherein the exceeded resource constraint comprises a constraint on the number of instructions in a shader program, a constraint on the number of texture reads in a shader program, a constraint on the number of temporary registers in a shader program, or a constraint on the number of texture coordinate registers in a shader program.

12. A tangible computer-readable medium storing computer-executable instructions for causing a computer to perform a method, the method comprising:
receiving at least one first parallel processing request at a parallel programming interface, the at least one first parallel processing request comprising at least one evaluation request of one or more parallel operations on one or more input arrays;
building an expression graph in response to receiving the at least one first parallel processing request at the parallel programming interface, the expression graph comprising nodes representing the one or more parallel operations; and
evaluating the one or more parallel operations in response to determining that a second parallel processing request received at the parallel programming interface subsequent to receiving the at least one first parallel processing request at the parallel programming interface requires evaluation of at least one of the one or more parallel operations, the determining occurring in response to receiving the second parallel processing request at the parallel programming interface, the evaluation comprising:
constructing one or more shader programs formed according to resource constraints of a graphics environment; the constructing comprising at least one of:
responsive to determining that a path of nodes of parallel operations through the expression graph comprises multiple texture coordinate operations, inserting a first shader break annotation in the determined path;
responsive to determining that appending shader code of a first child node to a parent node of the first child node will exceed a resource constraint of the graphics environment, inserting a second shader break annotation in the expression graph; and
breaking a second child node into a separate shader program, responsive to identifying an output texture from the second child node with a size constraint inconsistent with an input texture of a parent node of the second child node;
invoking the one or more shader programs on a graphics processor; and
returning an output of the one or more shader programs invoked on the graphics processor; and
wherein the at least one first parallel processing request and the second parallel processing request are received from an application program executing on a computer system.

13. The tangible computer-readable medium of claim 12, wherein the resource constraints of the graphics environment comprise a constraint on the number of uses of a register.

14. The tangible computer-readable medium of claim 12, wherein the resource constraints of the graphics environment comprise a constraint on the number of instructions in a shader program.

15. The tangible computer-readable medium of claim 12, wherein the resource constraints of the graphics environment comprise a constraint on the number of texture reads in a shader program.

16. The tangible computer-readable medium of claim 12, wherein the resource constraints of the graphics environment comprise a constraint on the number of temporary registers in a shader program.

17. The tangible computer-readable medium of claim 12, wherein the resource constraints of the graphics environment comprise a constraint on the number of texture coordinate registers in a shader program.

18. The tangible computer-readable medium of claim 12, wherein the resource constraints of the graphics environment comprise a constraint on the dimensions of a texture.

* * * * *